Feb. 15, 1966 P. D. KING ETAL 3,235,848

EDITING UNIT

Filed Feb. 13, 1962 20 Sheets-Sheet 1

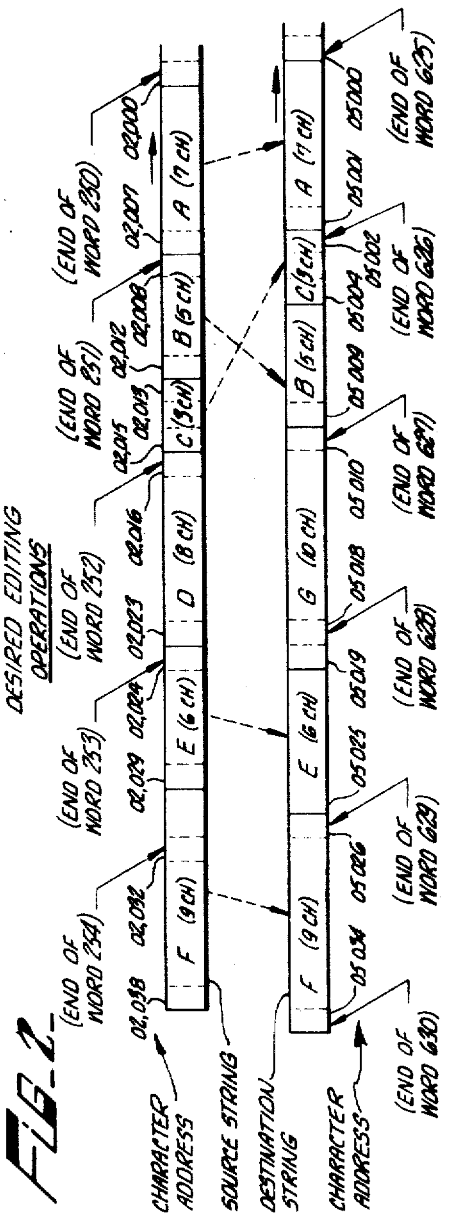
FIG. 2
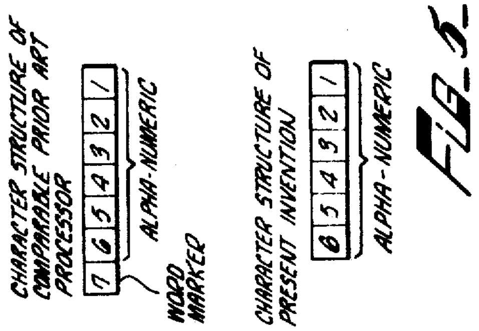
FIG. 4, FIG. 5
FIG. 3
| | COMPARABLE PRIOR ART PROCESSOR (1 CH) OPERATION | (5 CH) SOURCE ADDRESS | (5 CH) DESTINATION ADDRESS | PRESENT INVENTION OPERATION | REPEAT FIELD |
|---|---|---|---|---|---|
| 1 | SWM | 02.007 | — | RECALL S. | X |
| 2 | SWM | 02.012 | — | RECALL D. | X |
| 3 | SWM | 02.015 | — | T | 7 |
| 4 | SWM | 02.023 | — | SFS | 5 |
| 5 | SWM | 02.029 | — | T | 3 |
| 6 | SWM | 02.038 | — | SBS | 8 |
| 7 | SWM | 05.001 | — | T | 5 |
| 8 | SWM | 05.004 | — | SFS | 11 |
| 9 | SWM | 05.009 | — | SFD | 10 |
| 10 | SWM | 05.019 | — | T | 6 |
| 11 | SWM | 05.025 | — | T | 9 |
| 12 | SWM | 05.034 | — | | |
| 13 | TR | 02.001 | 05.001 | | |
| 14 | TR | 02.019 | — | | |
| 15 | TR | 02.008 | — | | |
| 16 | TR | 02.024 | 05.020 | | |
| 17 | TR | — | — | | |
TOTAL CHARACTERS OF STORAGE = 107
TOTAL BITS OF STORAGE = 749
TOTAL CHARACTERS OF STORAGE = 22
TOTAL BITS OF STORAGE = 132

EDITING UNIT

Filed Feb. 13, 1962 20 Sheets-Sheet 4

EDITING UNIT

Feb. 15, 1966 P. D. KING ETAL 3,235,848

EDITING UNIT

Filed Feb. 13, 1962 20 Sheets-Sheet 6

INVENTORS.
PAUL DANIEL KING
ROBERT STANLEY BARTON
BY ROBERT VOSS BOCK
Christie, Parker & Hale
ATTORNEYS.

INVENTORS.
PAUL DANIEL KING
ROBERT STANLEY BARTON
BY ROBERT VOSS BOCK
Christie, Parker & Hale
ATTORNEYS.

INVENTORS.
PAUL DANIEL KING
ROBERT STANLEY BARTON
BY ROBERT VOSS BOCK
Christie, Parker & Hale
ATTORNEYS.

INVENTORS.
PAUL DANIEL KING
ROBERT STANLEY BARTON
ROBERT VOSS BOCK
BY Christie, Parker & Hale
ATTORNEYS.

EDITING UNIT

Filed Feb. 13, 1962 20 Sheets-Sheet 10

INVENTORS.
PAUL DANIEL KING
ROBERT STANLEY BARTON
BY ROBERT VOSS BOCK
Christie, Parker & Hale
ATTORNEYS.

Feb. 15, 1966 P. D. KING ETAL 3,235,848

EDITING UNIT

Filed Feb. 13, 1962 20 Sheets-Sheet 12

INVENTORS
PAUL DANIEL KING
ROBERT STANLEY BARTON
BY ROBERT VOSS BOCK

Christie, Parker & Hale
ATTORNEYS.

INVENTORS
PAUL DANIEL KING
ROBERT STANLEY BARTON
BY ROBERT VOSS BOCK
Christie, Parker & Hale
ATTORNEYS.

INVENTORS.
PAUL DANIEL KING
ROBERT STANLEY BARTON
BY ROBERT VOSS BOCK
Christie, Parker & Hale
ATTORNEYS.

| STATE OF REG.-56 | STATE OF E16FF | TYPE OF ACCESS | INFORMATION REGISTER | ADDRESS REGISTER |
|---|---|---|---|---|
| 0 | 0 | NO ACCESS IN PROGRESS | | |
| 3 | 0 | READ | B | S |
| 4 | 0 | READ | A | M |
| 11 | 0 | WRITE | B | S |
| - | 1 | READ | P | C |

INVENTORS.
PAUL DANIEL KING
ROBERT STANLEY BARTON
BY ROBERT VOSS BOCK
Christie, Parker & Hale
ATTORNEYS.

FIG. 11

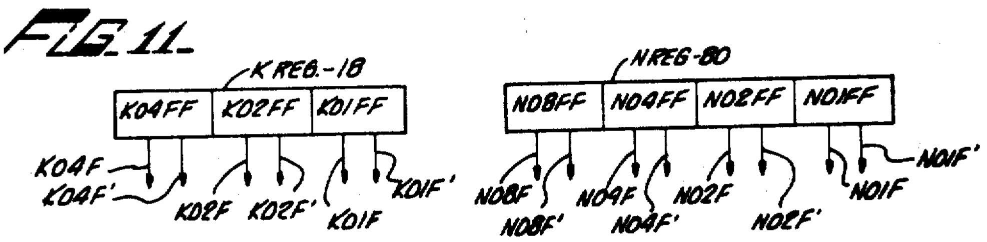

FIG. 11A

OPERATION OF N REGISTER

| | K≠N | | |
|---|---|---|---|
| | K≥4 | K<4 | K=N |
| TSDL | COUNT N-1 | COUNT N+1 | COUNT N+1 |

| | N AT START OF EXECUTION | N AT END OF EXECUTION |
|---|---|---|
| TSDL | N=0 OR N=K | N=K |

FIG. 12

FETCH FLOW

ANY J STATE

| | |
|---|---|
| MIR → P<br>PROFF → 1<br>EIG → 0<br>EI7 → 0 | MRAF |
| EI7F → 1 | EEZL · MWOF' · EIGF |
| | SECL |
| TROFF → 0 | PROF' |
| PROFF → 0 | |
| P → T,0 | PROF |

J=0

| | |
|---|---|
| P → T,0<br>PROFF → 0<br>TROFF → 1 | PROF · TROF' |
| | PROF' · TROF |
| L+1 | ICLF · EIGF' |
| PROFF → 1 | ICLF' · EIGF' · LESL' |
| C+1<br>EIGF → 1 | ICFL' · LESL |

FIG. 13

REVERSE AND FORWARD SKIP SOURCE FLOW

J=0 · (FSSL+RSSL)

| | |
|---|---|
| SECL | TEZL |
| | TEZL' · HEZL |
| T-1 | TLBL (FSSL+RSSL) |
| T-8 | TLBL' (FSSL+RSSL) |
| G+1 | FSSL · TLBL |
| G-1 | RSSL · TLBL |
| M+1 | FSSL (GE7L+TLBL') |
| M-1 | RSSL (GE7L+TLBL') |
| AROFF=0 | RSSL · GE7L+FSSL · GE7L+TLBL' |
| B+1 | HEZL'(FSSL+TEZL · RSSL) |
| M+1<br>AROFF=0 | GE7L |
| T-1 | HEZL' · RSSL · TEZL' |
| H=0 | |

INVENTORS.
PAUL DANIEL KING
ROBERT STANLEY BARTON
BY ROBERT VOSS BOCK
Christie, Parker & Hale
ATTORNEYS.

EDITING UNIT

Feb. 15, 1966 P. D. KING ETAL 3,235,848

EDITING UNIT

Filed Feb. 13, 1962 20 Sheets-Sheet 20

INVENTORS.
PAUL DANIEL KING
ROBERT STANLEY BARTON
BY ROBERT VOSS BOCK
Christie, Parker & Hale
ATTORNEYS.

3,235,848
Patented Feb. 15, 1966

3,235,848

EDITING UNIT

Paul Daniel King, Pasadena, Robert Stanley Barton, Altadena, and Robert Voss Bock, Monrovia, Calif., assignors to Burroughs Corporation, Detroit, Mich., a corporation of Michigan Filed Feb. 13, 1962, Ser. No. 173,615
18 Claims. (Cl. 340—172.5)

This invention relates to digital data processors and more particularly to an editing unit for a digital data processor.

Many times it is desirable to edit one string of information depending on the information contained in another string of information. For example, it may be desirable to transfer portions of a source string of information into a destination string of information or to delete portions of the destination string of information to form an edited destination string of information to be used for printing a line on a printing unit.

Modern digital data processors are becoming larger and more complex. Also programs for sequencing the operation of data processors generally become more complex with increasing complexity of the data processors. Many times the complexity of the program causes the cost of the program to approach that of the data processor itself. Therefore, it is desirable to simplify the program used for operating data processors and to allow the person writing the program to specify each program operation in the simplest and shortest way possible.

Editing is generally performed on words or blocks of characters of information. Fixed field length data processors handle information in words having a fixed number of characters. Variable field length data processors handle information in fields having variable numbers of characters. In variable field length data processors the field length is generally identified by a special character at the end of the field, or a special marker bit carried along with a character of the field or a special signal is provided in the sign position of a character. Variable field length data processors which handle information a character at a time require a memory access for each character to be operated upon.

The digital data processors which operate on words of information, generally read the information out of the memory a word at a time and it is necessary for the programmer to specify the actual address of the word. The digital data processors which handle information a character at a time generally read a character at a time out of the memory and it is necessary for the programmer to specify the address of each character read out of the memory. Modifications of the data processors handling a character at a time have been devised wherein a base character address is specified by the program and the base address incremented using relative addressing to address other characters to be read out of the memory.

A disadvantage of the above prior art digital data processors is that the programmer must keep track of the actual address of the information in the memory. A disadvantage of variable field data processors is that the programmer must somehow mark the end of each field. Also, in the data processors handling a character at a time, if relative addressing is used the base address must be remembered by the programmer and placed at the appropriate position in the program. In addition, the programmer must generally place the address of the characters to be operated upon in nearly every program step or else the data processor will not operate properly. A further disadvantage is that when it is desirable to operate on a group of characters forming parts of two different words a digital data processor which operates on words of information requires a complicated program to allow the desired characters in the two words to be processed which increases the number of program steps to be written by the programmer. Also, as the size and complexity of the program for a digital data processor increases the amount of storage space in the memory required for storing the program increases thereby decreasing the available memory space for the actual data which is to be processed.

In contrast, the program necessary for operating a digital data processor according to the present invention is very simple and only requires a minimum amount of information to be specified by the programmer in each program step. For example, most program steps require that the programmer only specify the type of operation to be performed and the number of characters the operation is to be performed upon. Also, a digital data processor incorporating the present invention has speed capabilities approaching that of a word type machine. The apparatus of the invention provides the programmer with an extremely important feature. The important feature is that the programmer has the complete versatility of writing his program without the necessity of bothering to remember actual addresses or to concern himself with the relation of the characters to words. The data processor apparatus allows the programmer to actually operate on the information as if it were two continuous strings of characters and may disregard the actual word lengths. Also, the programmer may operate on the strings of information in both a forward and a reverse direction completely eliminating any reference to the end and beginning of words.

Briefly, a specific embodiment of the present invention is: an editing unit for a data processor for editing characters of information. An addressable memory unit is provided for storing information. The information is represented by a source string of character signals and a destination string of character signals. Also, a program string of syllable signals is stored in the memory unit. Each syllable of the program identifies a complete editing operation and the number of source and destination string characters to be operated upon. The characters and syllables are arranged in words and stored in the memory unit. Reading circuits are connected for sequentially reading information out of the memory a word at a time. Three register circuits are connected for individually storing the source, destination and program words read out of the memory. Circuits are provided for sequentially executing the program syllables using the number of characters of the read-out source and destination words as specified by each program syllable of the read-out program word. Writing circuits are provided for writing a read-out destination word upon completing program operations upon each character thereof. The reading circuits further include circuits connected for reading out the next sequentially addressable source word upon completing a program operation upon each character thereof. A corresponding arrangement is provided for the destination word. The reading circuit also includes circuits for automatically reading out the next sequentially addressable program word upon the execution of each of the syllables of a read-out program word.

These and other aspects of the present invention may be more fully understood with reference to the following description of the figures of which:

FIG. 2 is a sketch showing an example of a series of editing operations which may be performed in an actual model of a data processor embodying the present invention;

FIG. 3 is a table showing the program steps necessary to cause a data processor embodying the present invention to execute the desired editing operation of FIG. 2, and showing the necessary program steps for a comparable prior art data processor;

FIG. 4 is a sketch showing the character structure of the comparable prior art data processor referred to by way of example in FIG. 3;

FIG. 5 is a sketch illustrating the character structure of a data processor embodying the present invention;

FIG. 11 is a sketch showing the flip-flop circuits of the K-register and the N-register of FIG. 7;

FIG. 11A shows two tables illustrating the operation of the N-register of FIG. 7.

FIG. 12 is a flow diagram illustrating the sequence of operation of the data processor of FIG. 6 during the fetch of program syllables;

FIG. 13 is a flow diagram illustrating the sequence of steps of operation of the data processor of FIG. 6 while executing reverse and forward skip source program syllables;

FIG. 15 is a timing diagram showing the sequence of operation of the data processor of FIG. 6 while fetching program syllables;

Figure 6:
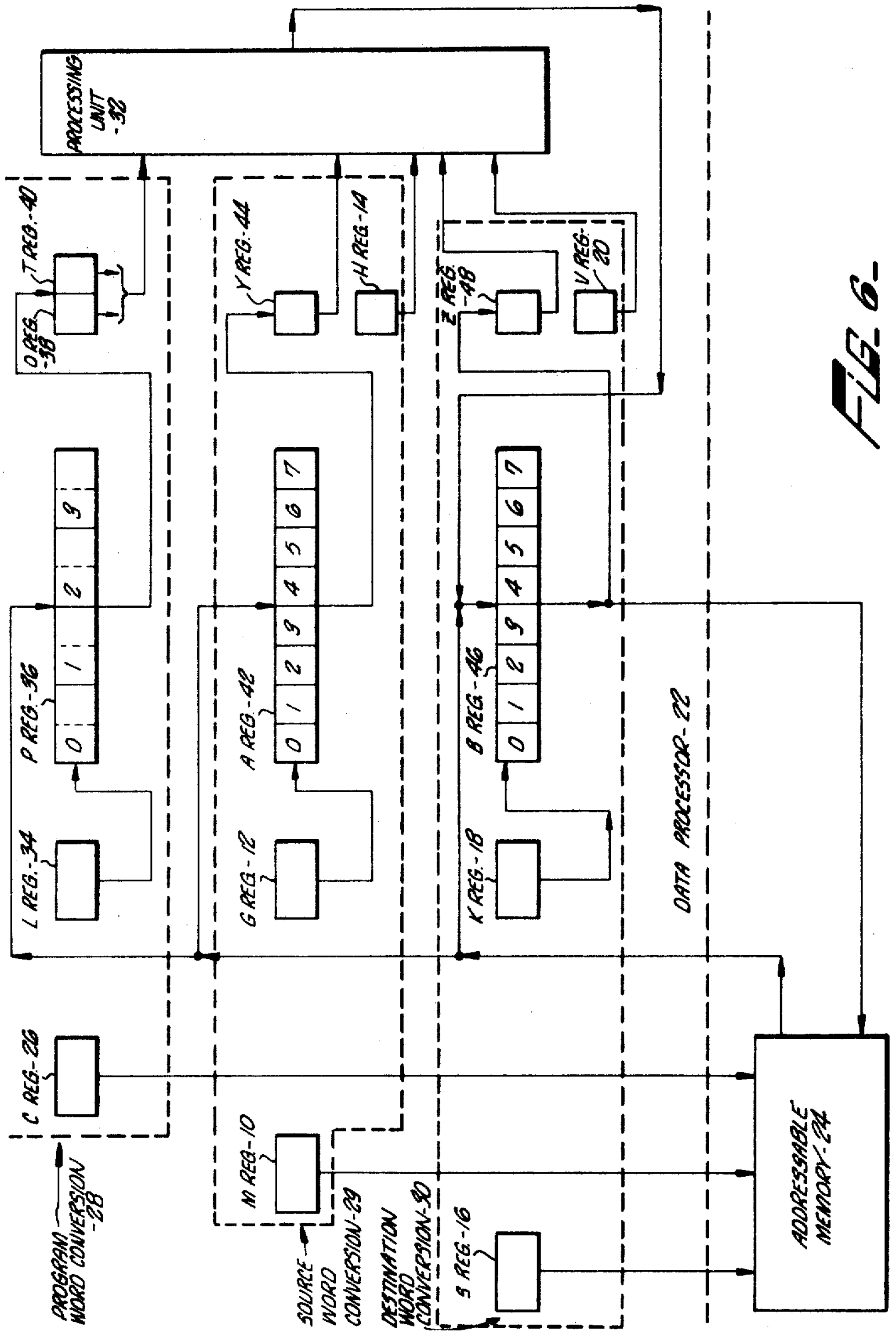
FIG. 6 is a general block diagram of a data processor and a memory unit and embodying the present invention.
Figures 10, 16:
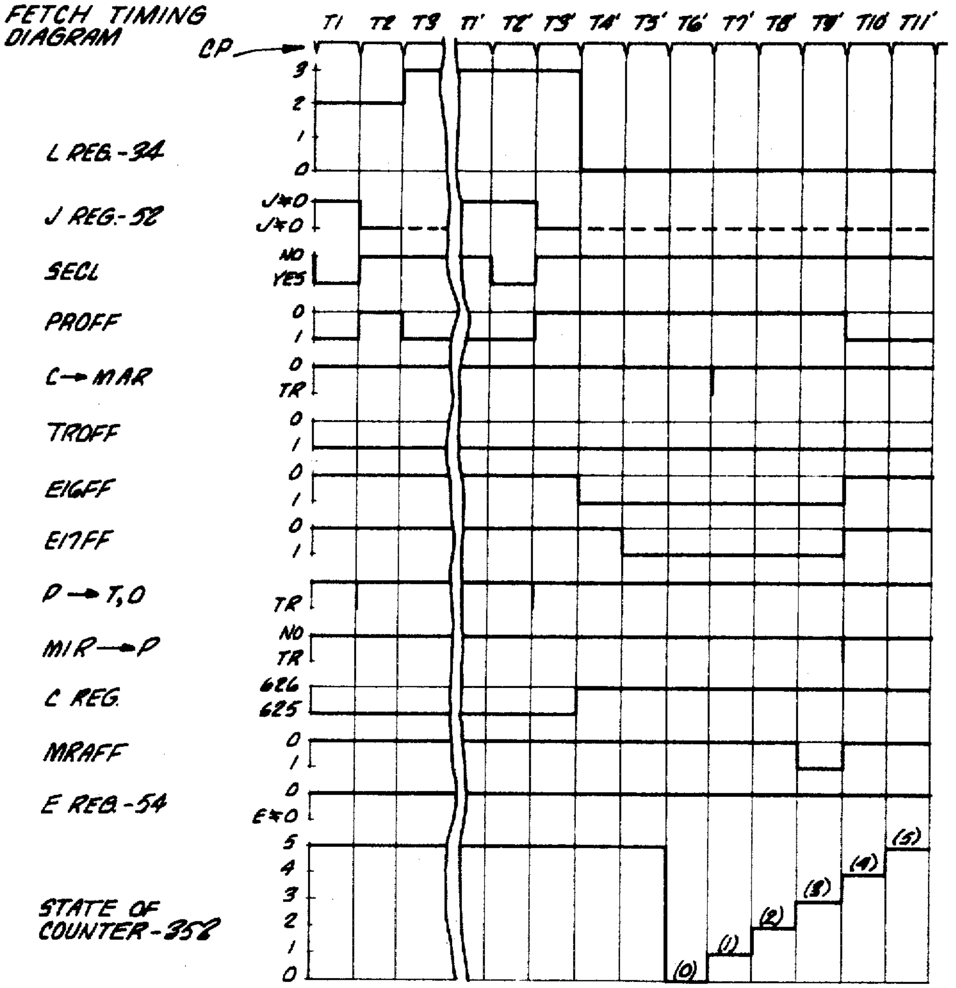
FIG. 10 is a table showing the states of the E-register of FIG. 7 and the corresponding operations of the memory of FIG. 6.
Figure 16A:
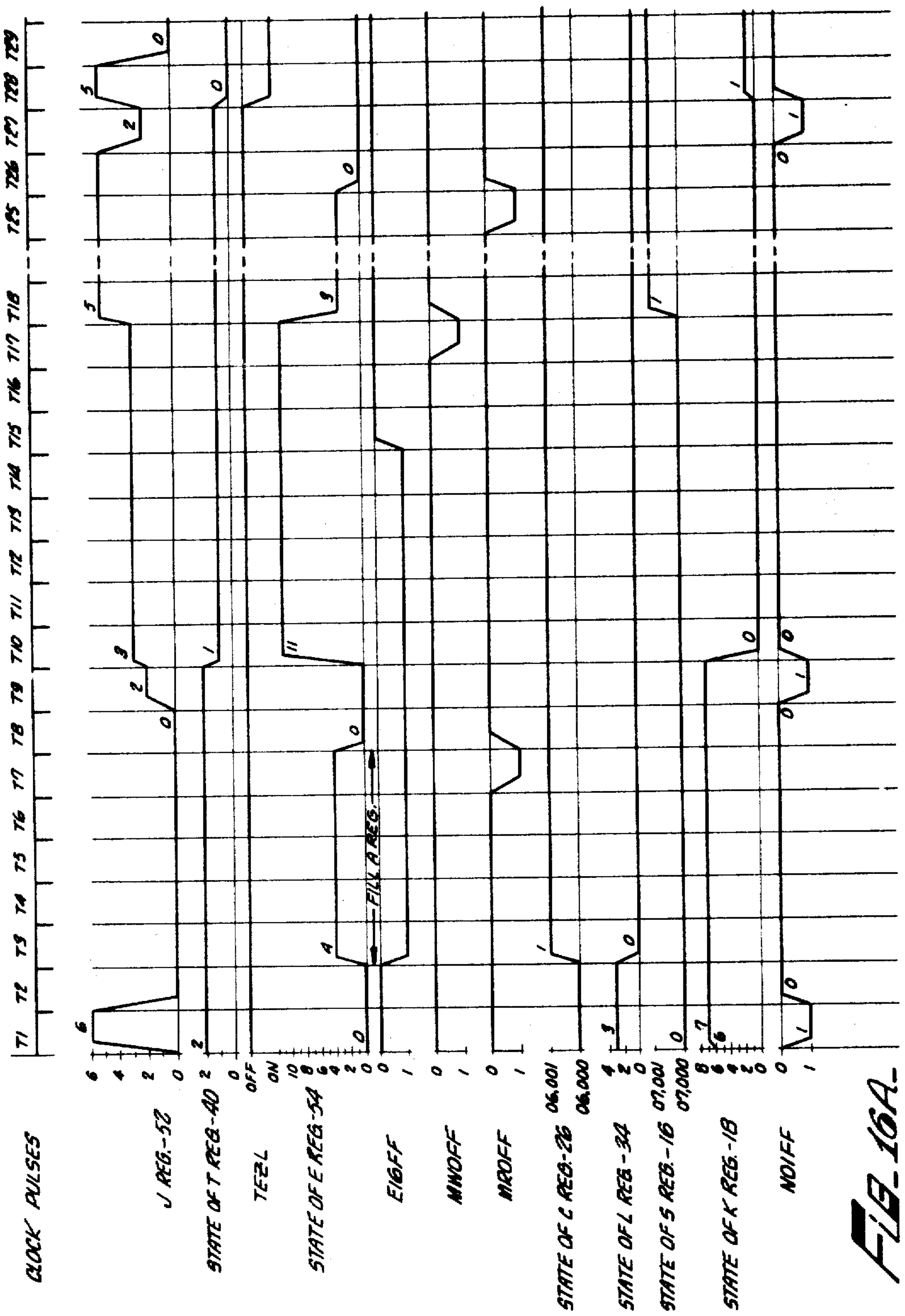
Figure 16B:
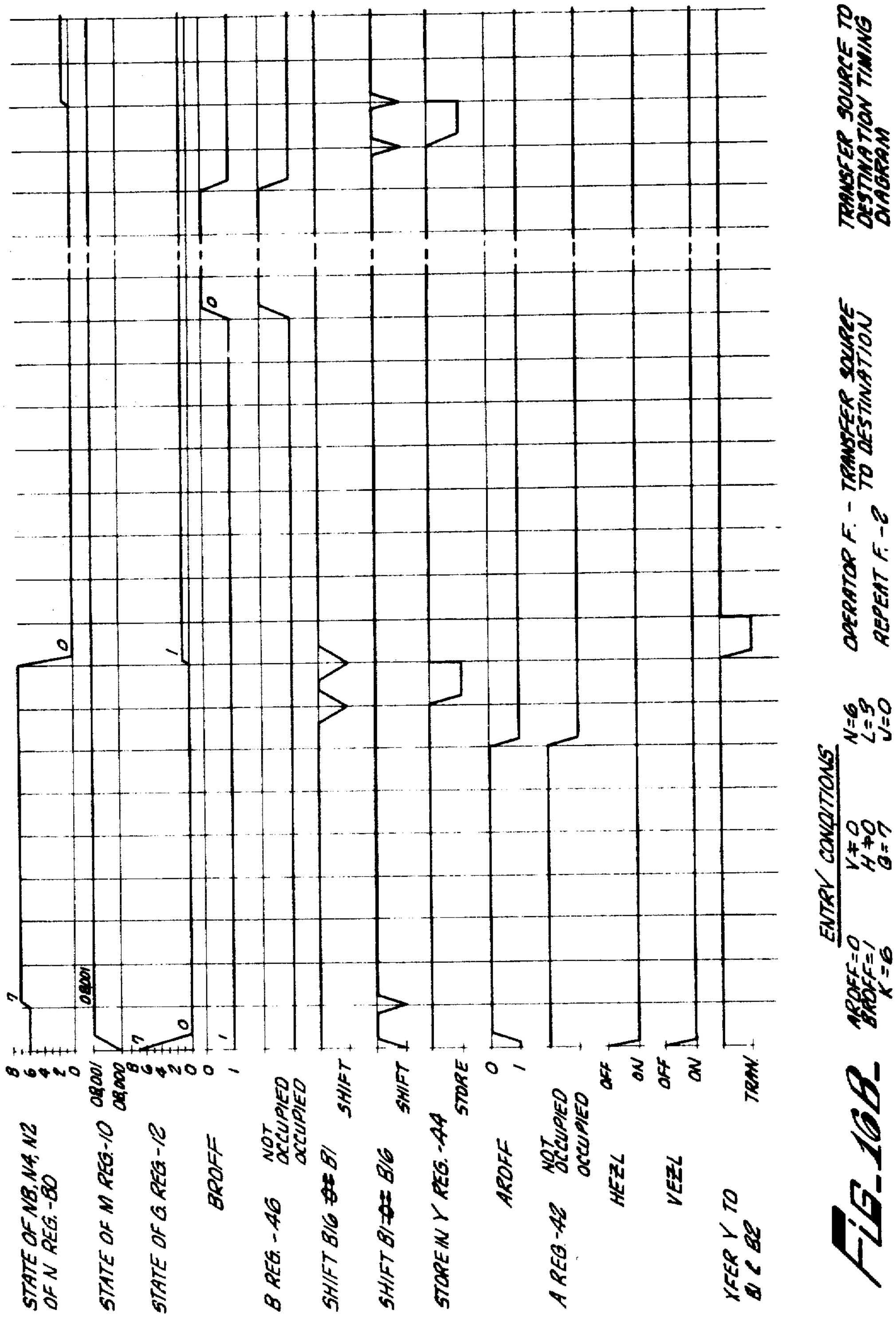
Figure 17:
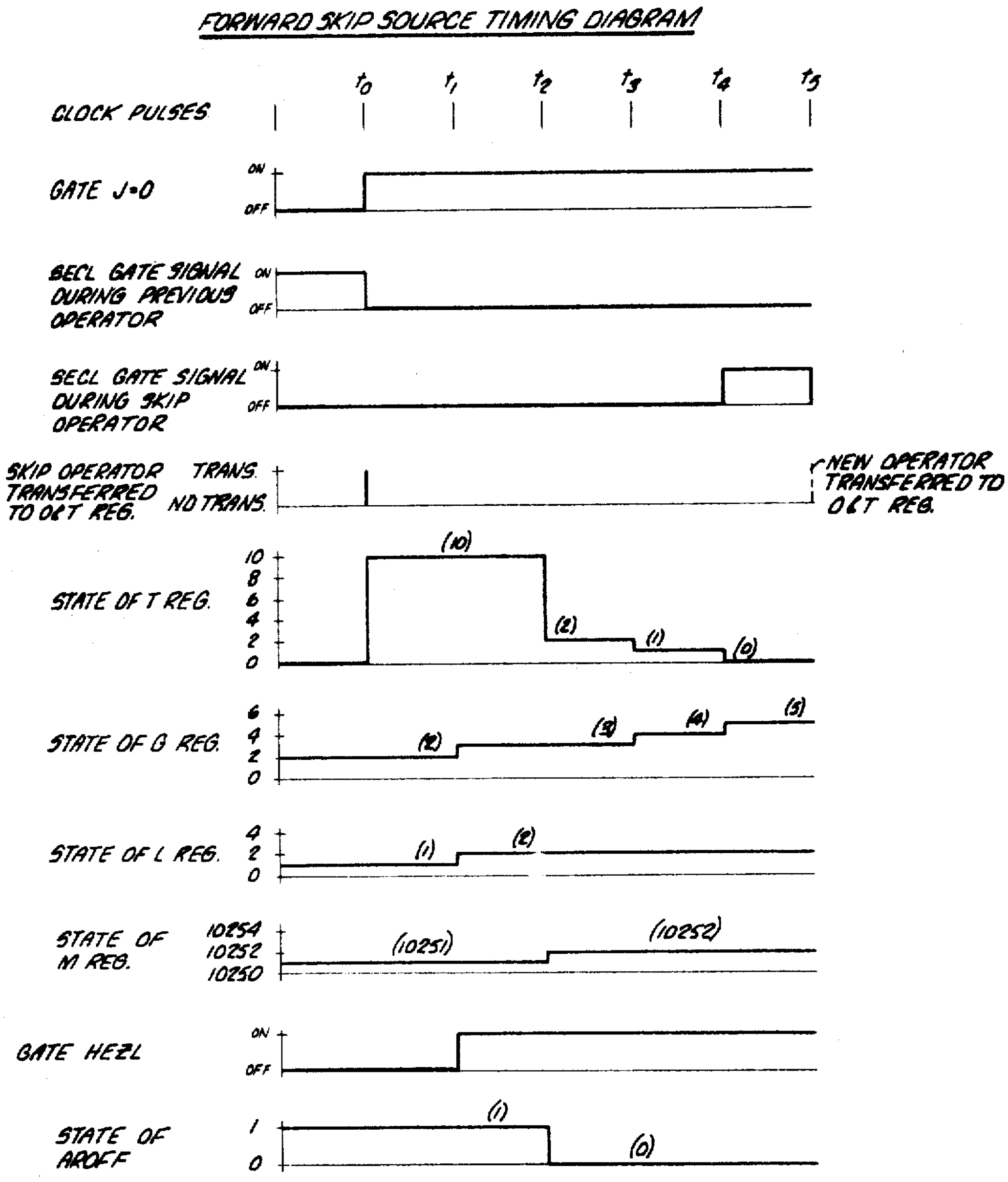

FIGS. 16A and 16B form a timing diagram illustrating the sequence of operation of the data processor of FIG. 6 while executing a transfer source to destination program syllable; and FIG. 17 is a timing diagram illustrating the sequence of operation of the data processor of FIG. 6 while executing a forward skip source program syllable.

*Compression with prior art*

Before explaining the present invention, a brief description will be given of the typical desired editing operations to be performed in a digital data processor as illustrated in the sketch of FIG. 2. Also, the program steps for executing the editing operations shown in FIG. 2 as required by the present invention will be compared with the program steps required to do the same operations in a comparable data processor.

Refer now to FIG. 2. As indicated in FIG. 2, characters of a source string of information are to be integrated with the characters of a destination string of information. The characters of the source string of information are divided into blocks of variable field lengths represented by the symbols A, B, C, D, E and F. Similarly the destination string of information is divided into blocks represented by the symbols A, C, B, G, E and F. As indicated by the dashed lines in FIG. 2, it is desired to transfer the seven characters of the A field from the source string of information into the correspondingly referenced field of the destination string. Next the five characters of the B field must be skipped and the three characters of the C field must be transferred from the source string into the C field of the destination string. Following this operation the data processor must skip back to the B field in the source string and the five characters of the B field must be transferred to the B field of the destination string. Subsequently the C and D fields of the source string must be skipped and the six characters of the E field transferred to the E field of the destination string. Finally the nine characters of the F field must be transferred to the F field of the destination string. It should be noted that the G field in the destination string is to be left unaltered.

It should be noted that FIG. 2 shows the A, B, C, D, E and F fields of the source string identified by end characters referenced by character addresses 02,007, 02,012, 02,015, 02,023, 02,029, and 02,038. FIG. 2 also shows the destination string fields A, C, B, G, E, and F with characters identifying the end of the fields.

A specific data processor embodying the present invention and described herein has characters of the source and destination strings arranged in words, each having eight characters. The words are stored in the memory thereof. In order to illustrate the relation of words to the characters of the source and destination strings used in the data processor embodying the present invention, FIG. 2 shows the words 250, 251, 252, 253 and 254 of the source string stored in the corresponding end of word character addresses 02,000, 02,008, 02,016, 02,024, and 02,032. The destination string has similar identification symbols.

Refer now to the program steps required to execute the editing operations, illustrated in FIG. 2, by a prior art data processor comparable to the present invention.

As indicated, in the source address and destination address columns of FIG. 3, twelve program steps are required to set markers indicating the end of each field of both the source and destination strings. Thus program steps 1 through 6 specify that the "marker" be placed at the end of the A, B, C, D, E and F fields of the source string of information. Program steps 7 through 12 specify that an end of word marker be placed at the end of the A, C, B, G and F fields of the destination string of information. Only the program steps 13 through 17 actually cause the data processor to perform the editing operations indicated in FIG. 2. Thus program step 13 of the comparable data processor specifies a transfer operation, the address of the first character of the A field of the source string to be transferred, and the address of the first character of the A field of the destination string into which the A field of the source string is to be transferred. This program step will cause the transfer of the complete A field. Similarly, program steps 14 and 15 specify the operation of transfer and the address of the first character of the source fields C and B. However, incrementing is used to form the address of the first character of the destination field address from the last destination address since they are located sequentially one after the other in memory. Program step 16 again specifies the operation of transfer and the address of the first character of the E field in the source string. However, since the G field of the destination field was skipped, incrementing cannot be used to form the beginning address of the G field of the destination string. Therefore, the address of the first character of the E field of the destination string is written into program step 16. Program step 17, only specifies the operation of transfer. The address of the first character of the source as well as the destination string is formed through incrementing and relative addressing.

The two right hand columns of FIG. 3 indicate the corresponding program required for executing the desired editing operations illustrated in FIG. 2 in a data processor embodying the present invention. Only two parts are required for the programs in each step to specify an operation field and a repeat field. The operation field specifies the type of editing operation to be performed whereas the repeat field specifies the number of characters the operation is to be performed upon. The first two program steps of the data processor of the present invention are referred to as recall source and recall destination operations. During the recall source and recall destination operations a form of relative addressing is used in order to form the beginning addresses of both the source and the destination strings of information. This is, in general, the only reference the programmer need make to the actual addresses of memory. Program step 3 specifies that seven characters of the A field of the source string are to be transferred to the destination string. Program step 4 specifies that the data processor is to skip forward in the source field five characters thereby skipping the B field and arriving at the beginning of the C field. Program step 5 specifies that the three characters of the C field are to be transferred to the destination string. Program step 6 specifies that the data processor is to skip back in the source string eight characters thereby skipping over the C and B fields and arriving at the beginning of the B field. Program step 7 specifies that five characters of the B field are to be transferred from the source to the destination string. Program step 8 specifies that the data processor unit is to skip forward in the source string eleven characters thereby arriving at the beginning of the E field. Program step 9 specifies that the data processor is to skip forward in the destination string ten characters thereby arriving at the beginning of the E field of the destination string. Program steps 10 and 11 specify that the six characters of the E field and the nine characters of the F field are to be transferred to the destination string.

FIGS. 4 and 5 illustrate the structure of the characters of the comparable processor referred to in FIG. 3 and the structure of the characters of the present invention. As indicated in FIG. 4, six characters are used to form alphanumeric coded information. A seventh bit is required for the word marker to indicate the end of each field of the source and destination string. As indicated in FIG. 5, a total of only six characters are required in each character. The six bits of the character of the present invention are used to represent alpha-numeric coded information.

The comparable prior art processor requires memory-storage for one character to specify each operation of a program step and five characters each to specify each source address and each destination address of a program step. In contrast, the present invention only requires two characters for each program step, one character for the operation field and one for the repeat field.

Referring now to FIG. 3, a total of 107 characters of storage or 749 bits of storage is required to store the program of a comparable prior art processor. In contrast only 22 characters or a total of 132 bits of storage is required to store the program illustrated in FIG. 3 for the data processor of the present invention referred to hereinabove.

GENERAL DESCRIPTION

Figure 1:
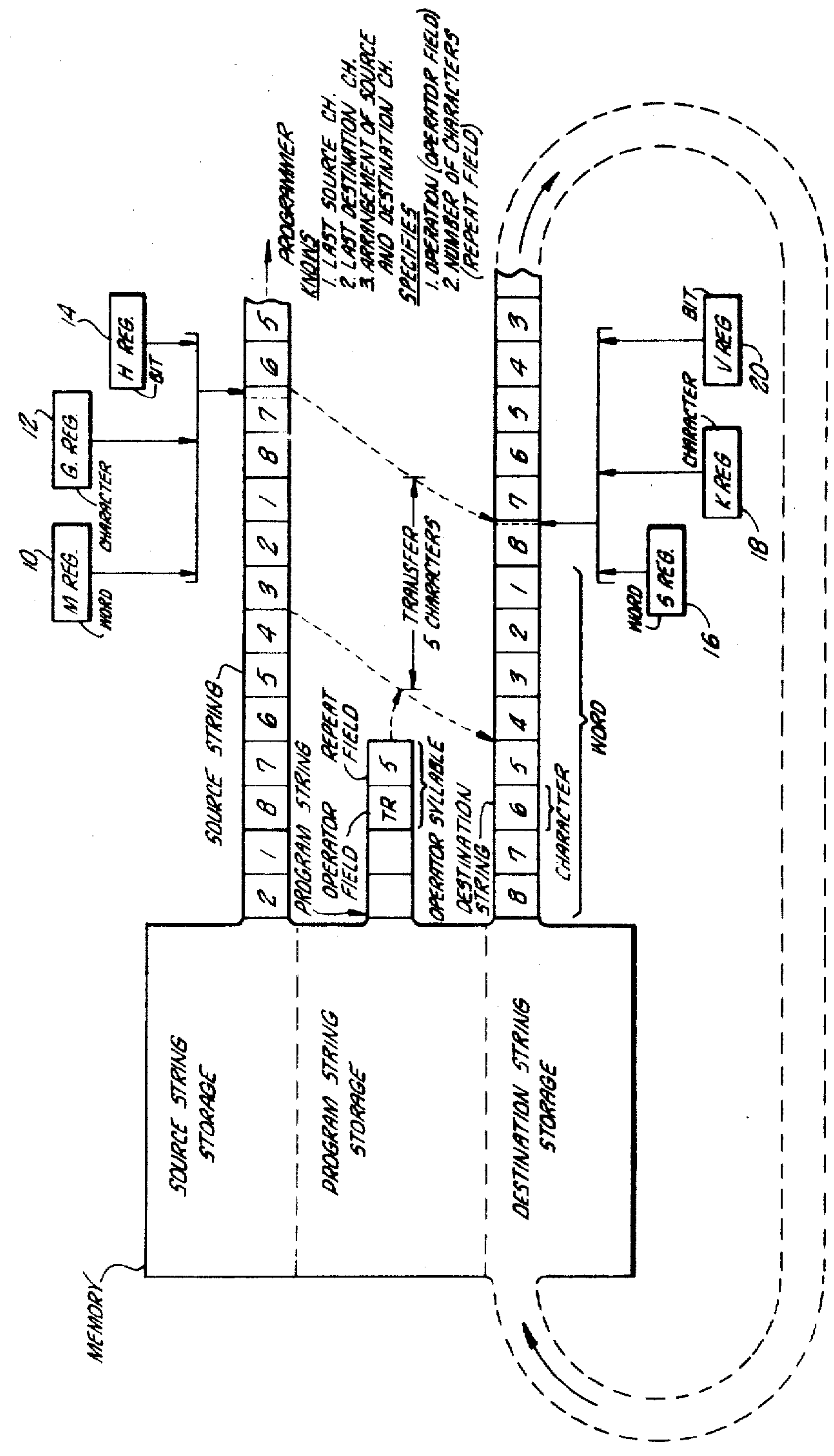
FIG. 1 is a sketch illustrating the basic operation of a digital data processor and embodying the present invention.

Refer now to FIG. 1 which is an illustrative diagram indicating a general operation of the data processor and embodying the present invention. The source, destination and program information is arranged in continuous strings of characters but divided into words having eight characters each for storage in a memory unit. The source, destination and program strings of information are respectively stored in source, destination and program storage areas of memory. As indicated in FIG. 5, each character is composed of six bits for representing either numeric or alphabetic information. Although the source, destination and program characters are arranged in words, the characters are actually handled as a continuous string of characters. During the editing operation the source string is integrated with the destination string and the resultant, edited destination string is stored back into the destination storage of the memory unit.

The program words are also divided into four syllables of two characters each. One character of a program syllable is the operation field and the other the repeat field described in connection with FIG. 3.

FIG. 1 illustrates an operation wherein the operator syllable being executed specifies that five characters are to be transferred from the source field to the destination field. To be explained in detail herein below, the data processor will execute the operator shown in FIG. 1 by automatically transferring the five characters of the source field which follow the last character to be operated on (by the previous operator syllable) to the five character positions of the destination string following the last character thereof operated upon. Also in executing the transfer operator syllable, the five characters of the destination string are destroyed as they are replaced by the source characters.

Thus it should now be evident that the programmer only needs to know how the source and destination strings of information are arranged and remember the last source and destination characters operated upon. The programmer need not remember the actual addresses of the last source and destination characters operated upon. Knowing this information, the programmer then specifies the operation (operator field) and the number of characters (repeat field) to be operated upon.

Since it is actually necessary to have some means to locate the address of the next character to operate upon, an M register 10 and a G register 12 are provided for indicating the address of the next word and the character within the word to be operated on by the editing unit. Also, in some instances it is necessary to know the next bit of the character to be operated upon. For this purpose an H register 14 is provided. An S register 16 and a K register 18 are provided for indicating the next word and character of the word of the destination string to be operated upon. Also a V register 20 is provided for indicating the next bit of the character to be operated upon for use in special operators. Although the H and V registers 14 and 20 are used for indicating the next bit of the character to be operated upon in the execution of some operator syllables, the operator syllables described herein use the H and V registers 14 and 20 for timing purposes only.

Refer now to the general block diagram of an actual data processor 22 and a memory 24 shown in FIG. 6 and embodying the present invention. The data processor 22 is the actual portion of the invention which performs the editing operations. The memory unit 24 stores the source, destination and program strings to be used by the data processor 22 in the editing operations. In addition to the M register 10 and the S register 16 for indicating the address of the words in the memory 24 of the source and destination strings to be operated upon, a C register 26 is provided for indicating the address of the next word of the program string to be used for sequencing the operation of the data processor 22.

The data processor 22 may be generally divided into a program word conversion section 28, a source word conversion section 29, a destination word conversion section 30, and a processing unit 32. The program word conversion section 28 includes the C register 26, an L register 34, a P register 36, an O register 38 and a T register 40. The source word conversion section 29 includes the M register 10, the G register 12, an A register 42, a Y register 44 and the H register 14. The destination word conversion section 30 includes the S register 16, the K register 18, the V register 20, and a B register 46, and a Z register 48.

With the general arrangement of the data processor 22 and the memory 24 in mind refer to the general operation thereof. The program, source, and destination words are sequentially read out of the memory unit 24 and stored in the P register 36, the A register 42 and the B register 46, respectively. The C register 26, the S register 16 and the M register 10 each point to the addresses indicating the word of the corresponding string of information to be read out of the memory 24 and stored in the P, A and B registers 36, 42 and 46. The G and K registers 12 and 18 indicate the next characters, stored in the A and B registers 42 and 46, to be used in the editing operation. Similar to the G and K registers 12 and 14, the L register 34 indicates the next operator syllable stored in the P register 36 to be used in controlling the operation of the data processor 22.

The operation of the program word, source word and destination word conversion sections 28, 29 and 30 may best be understood by considering the operation of each separately.

Referring to the program word conversion section 28, the program syllable stored in the P register 36 and indicated by the state of the L register 34 is read out of the P register 36 and stored in the O and T registers 38 and 40. The operator field of the syllable is stored in the O register 38, whereas the repeat field is stored in the T register 40. The data processor 22 then starts executing the program syllable stored in the O and T registers 38 and 40. The execution is generally performed by operating on a character of the source and/or destination strings, at a time. Each time a character is operated upon, the state of the T register 40 is decreased one unit. When the T register 40 enters state zero, the execution of the program syllable is complete. Also, when the T register 40 enters state zero, the next syllable of the program word indicated by the state of the L register 34, is read out of the P register 36 and stored in the O and T registers 38 and 40 and the state of the L register 34 is increased one unit. The new operator syllable is then executed. When the L register 34 indicates that the last program syllable stored in the P register 36 is being executed, the state of the C register 26 is increased one unit to point at the next sequential program word stored in the memory 24 and the next sequential word is automatically read out for storage in the P register 36 and execution.

Thus, it may be seen that the program word conversion section 28 converts the program words in the memory 24 to a continuous string of program syllables.

Referring to the source word conversion section 29, characters are transferred from the A register 42 to the Y register 44 one at a time. The character to be transferred to the Y register 44 is indicated by the state of the G register 12. Also, other operations are performed on characters of the A register which do not involve a transfer to the Y register 44. However, the character operated upon is specified by the state of the G register 12. The state of the T register 40 is decreased one unit and the state of the G register increased or decreased one unit for each character operated upon. When the G register 12 indicates the last character of the source word stored in the A register 42 is operated upon the state of the M register 10 is automatically modified to indicate the address of the next source word to be read out of the memory 24. The next source word is then read out and stored in the A register 42. The completion of operations upon each of the characters of the source word stored in the A register 42 may occur in the middle of executing a program syllable. However, the source word conversion section 29 automatically and independently, of the program word conversion section 28, causes the next source word to be read out in order to provide an immediate supply of source characters for editing.

Thus, the source word conversion section 29 in effect converts source words to a continuous string of source characters for editing.

The destination words stored in the B register 46 are edited according to the operator syllables stored in the P register 36 and using the source string characters stored in the A register 42. The operation of the destination word conversion section 30 is similar to that of the source word conversion section 30 except that after each character of the destination word stored in the B register 46, is operated upon and the state of the K register 18 so indicates, the word is generally a completely edited word and must be stored in the memory 24. The edited destination word stored in the B register 46 is then written back into the same memory location from which the original unedited destination word was read. The state of the S register 16 is then modified to indicate the next sequential destination word to be edited and the word is read out of the memory 24 and stored in the B register 46.

Circuits in a data processor embodying the present invention for executing three types of operator syllables will be described herein. The three operator syllables are called a transfer source to destination operator syllable, a forward skip source operator syllable and a reverse skip source operator syllable. The transfer source to destination operator syllable causes characters to be transferred from the A register 42 to the B register 46. The skip operators cause the H register 10 and the G register 12 to be adjusted and skip over the words and/or characters as specified by the skip operator syllables. If the skip operator is a forward skip operator syllable, the states of the M register 10 and the G register 12 are increased accordingly in one direction. If the skip operator syllable is a reverse skip operator syllable, the states of the registers are decreased accordingly in the opposite direction.

DETAILED DESCRIPTION

*Description of circuits*

Figure 7:
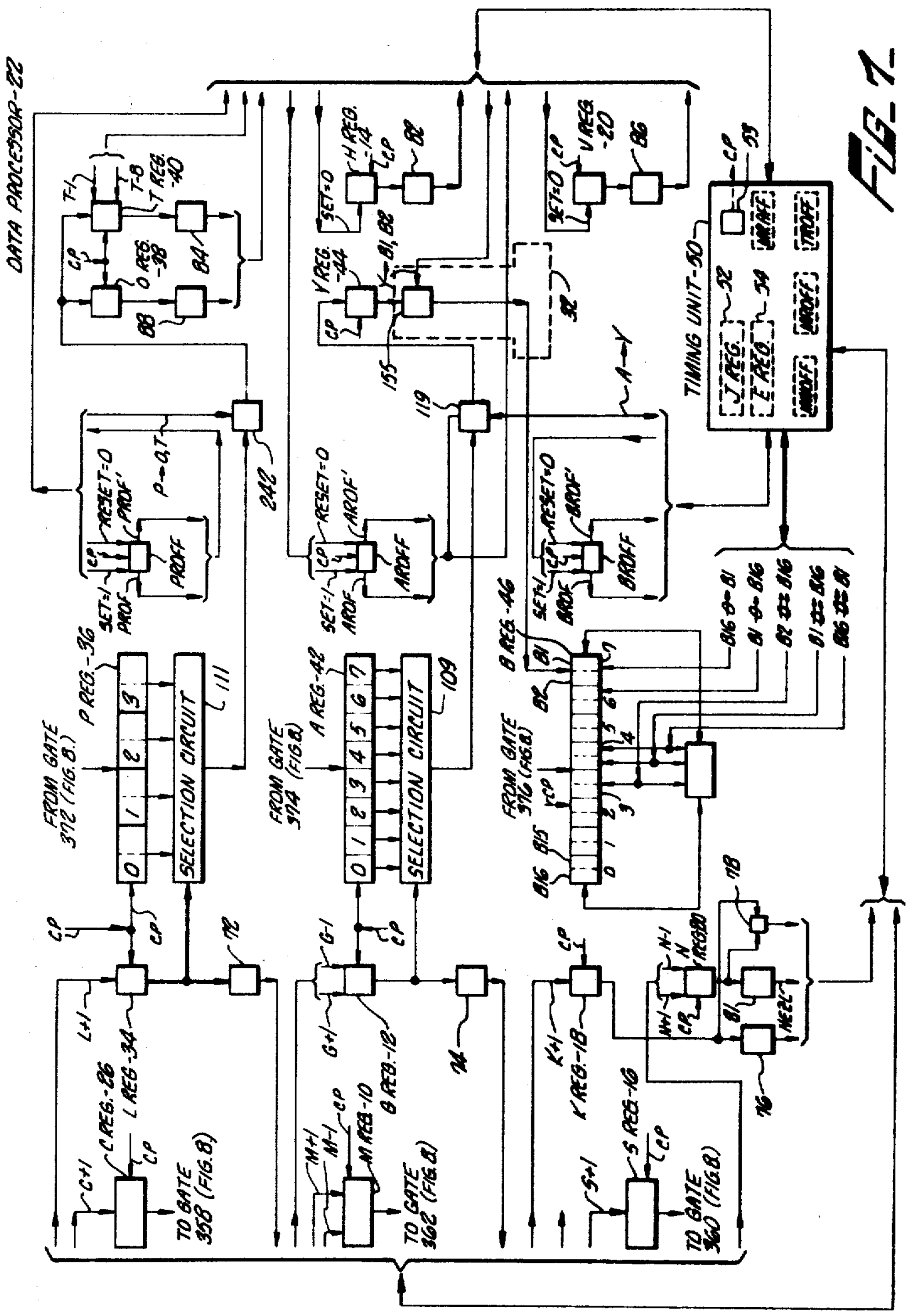
FIGS. 7 and 8 show a detailed block diagram, partly in schematic diagram form, of the data processor and memory unit of FIG 6.

Refer now to the detailed schematic diagram of the processor 22 shown in FIG. 7. As indicated in FIG. 7, a timing unit 50 is provided having a source of clock pulses 53, control registers 52 and 54 and timing flip-flops represented by the symbols MWOFF, MROFF, MRAFF, and TROFF. The MWOFF and MROFF flip-flops are for controlling the writing and reading of the source and destination words in the memory 24, whereas the MRAFF flip-flop is for controlling the reading of the program string out of the memory 24. The flip-flops of the timing unit 50 are shown along with the corresponding input and output circuits in FIG. 9P.

Figure 8:
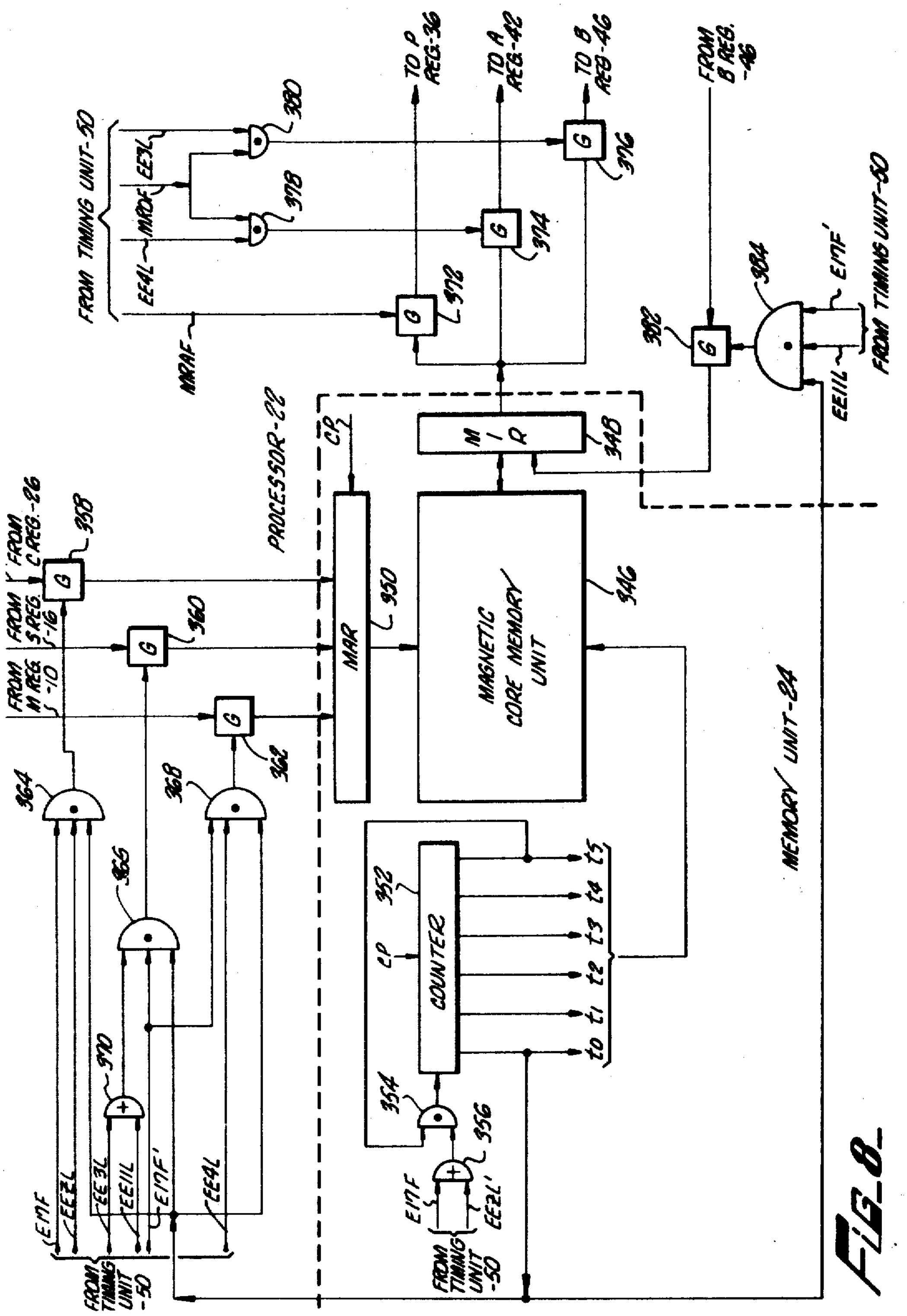

The operation of all the registers and flip-flops of FIGS. 7 and 8 are triggered from one state to another and store information at the occurrence of clock pulses unless otherwise specified. Thus, each of these circuits has an input from the output circuit CP of the source of clock pulse 53 for synchronizing the operation thereof.

The flip-flop circuits referred to herein each have a pair of output circuits having reference symbols similar to the designation of the flip-flop. For example, the MRAFF flip-flop has output circuits MRAF and MRAF'. The flip-flop circuits are referred to as having "1" and "0" states. A flip-flop in a "1" state develops a control signal at the unprimed output circuit thereof (i.e. MRAF) whereas a flip-flop in an "0" state develops a control signal at the primed output circuit thereof (i.e. MRAF').

Figures 9A, 9B, 9C:
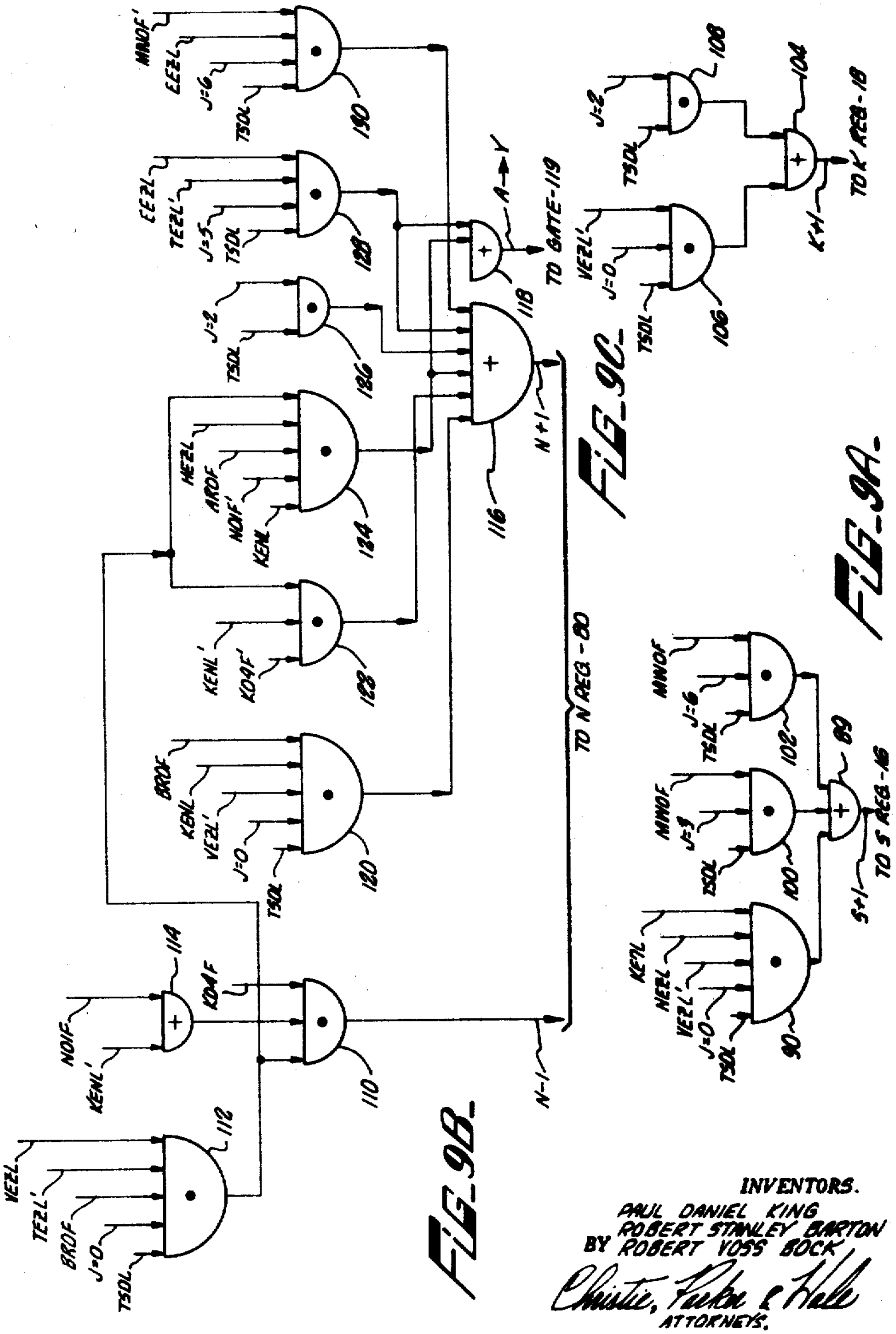
FIGS 9A through 9T are schematic and block diagrams showing the details of the timing unit of FIG. 7.
Figure 9D:
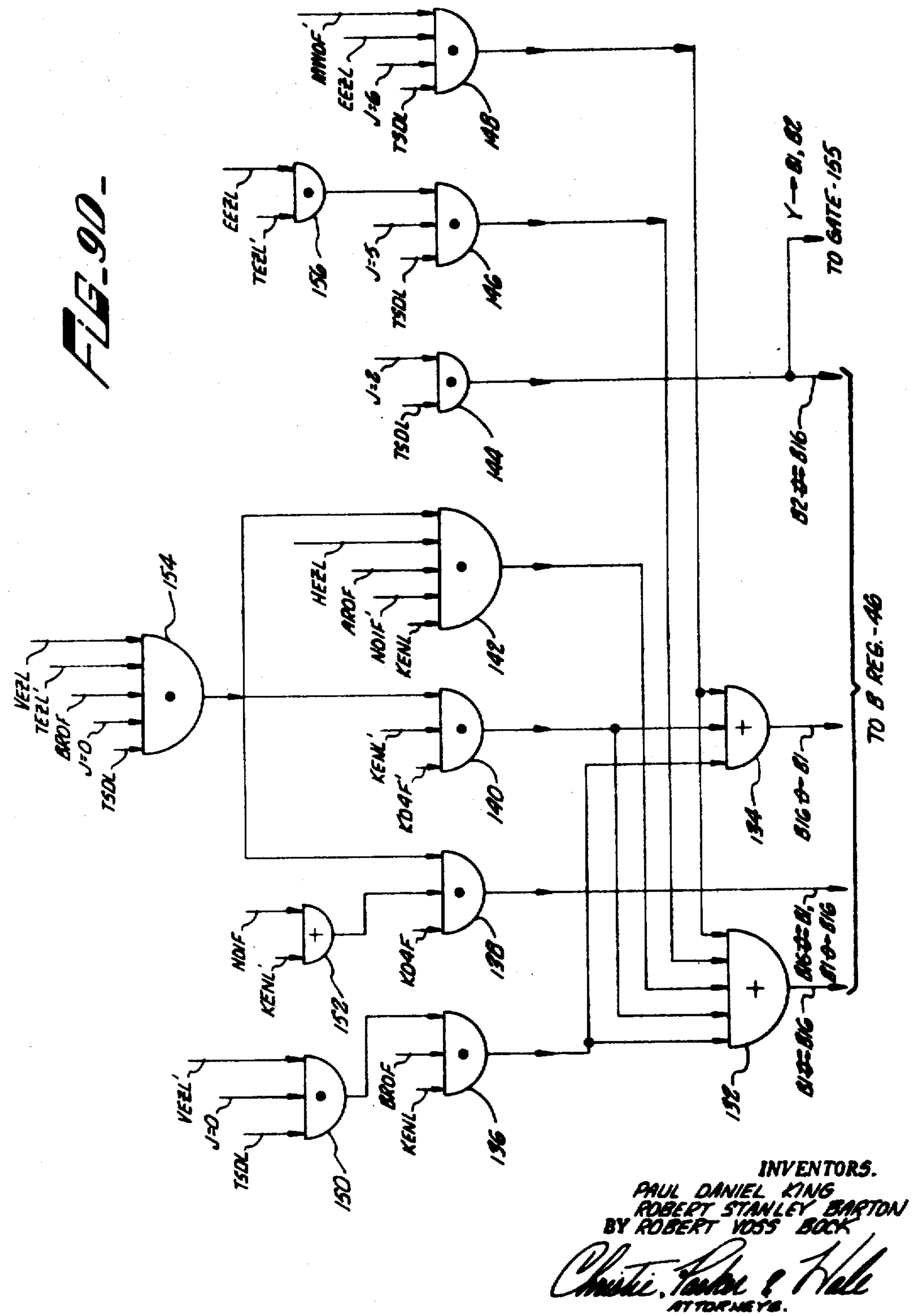
Figures 9E, 9F, 9G:
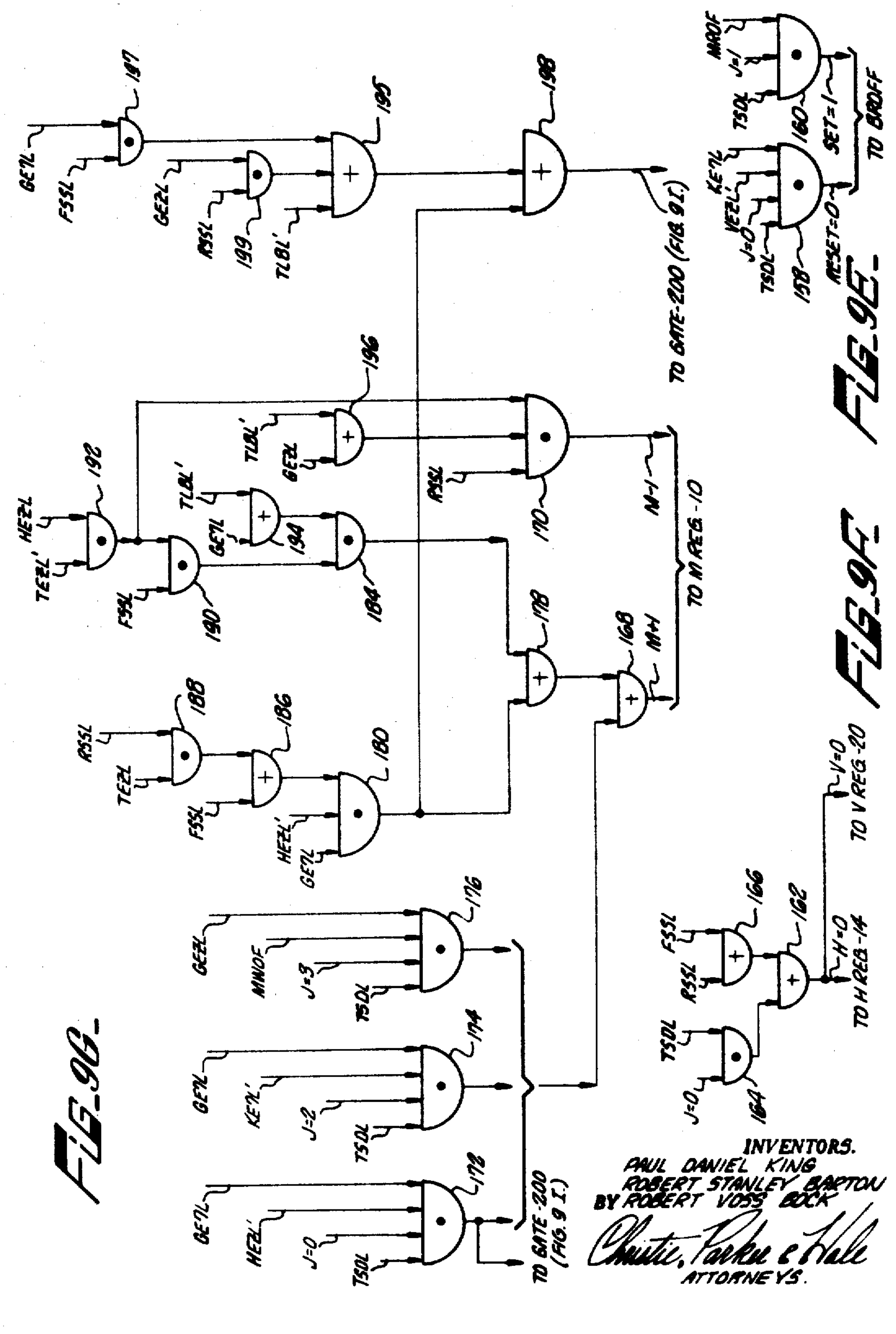
Figure 9I:
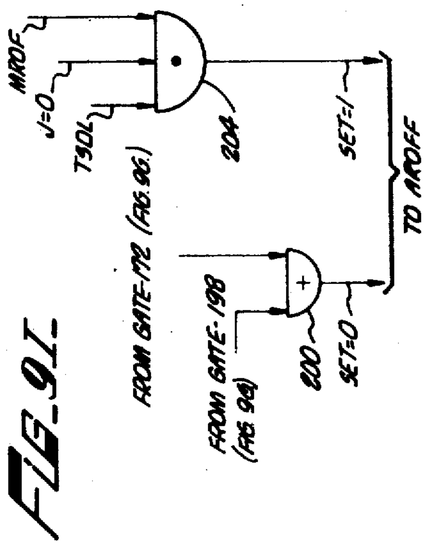
Figure 9J:
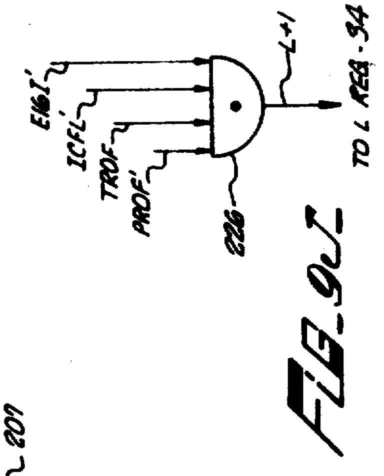
Figure 9H:
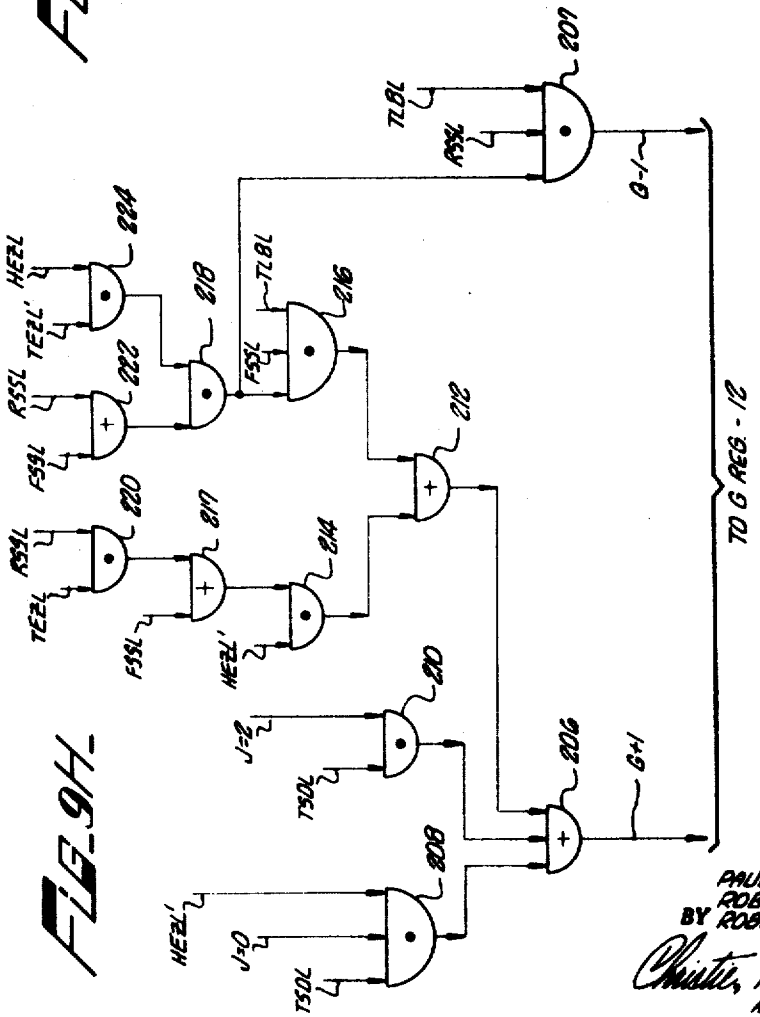
Figures 9K, 9L:
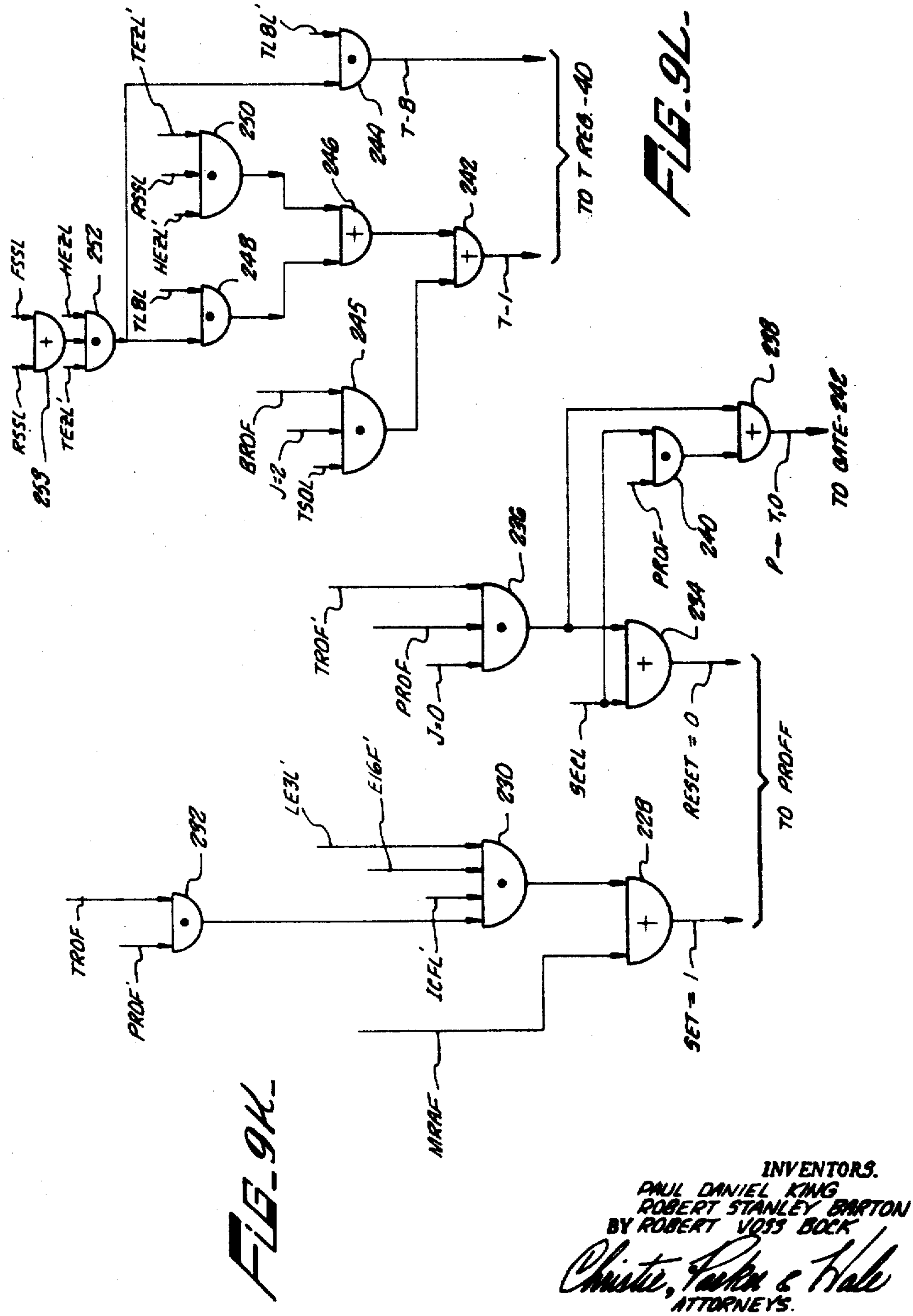
Figure 9M:
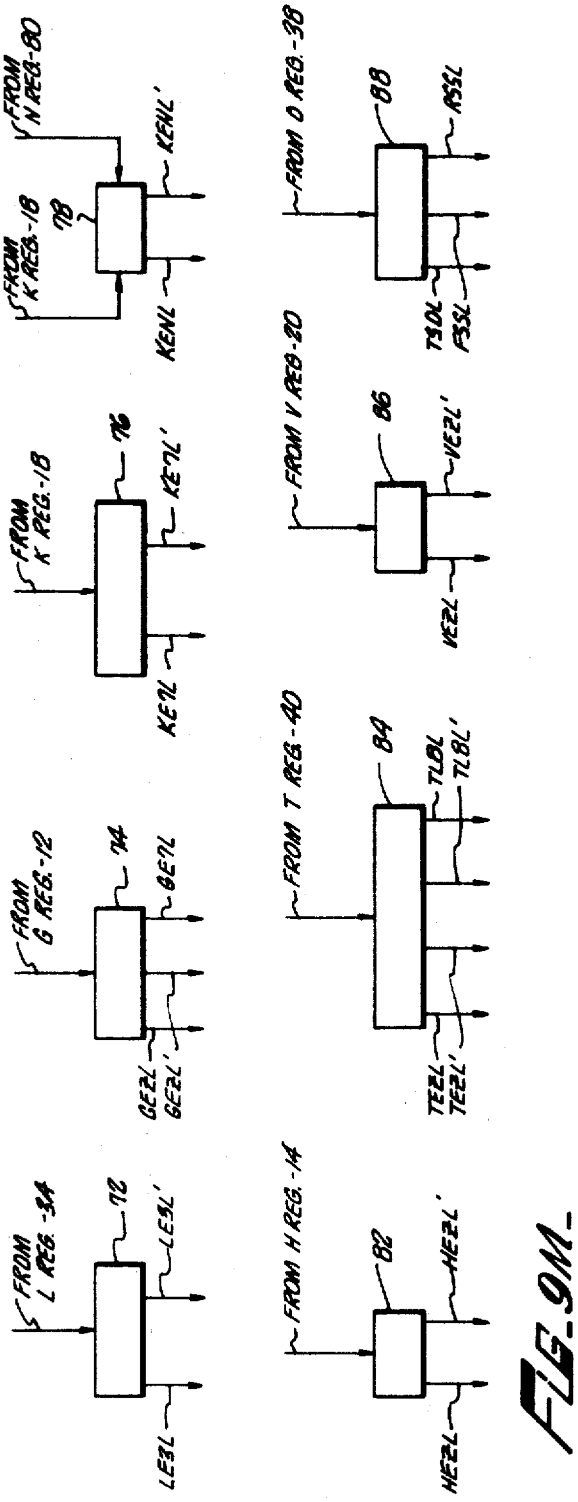
Figure 9N:
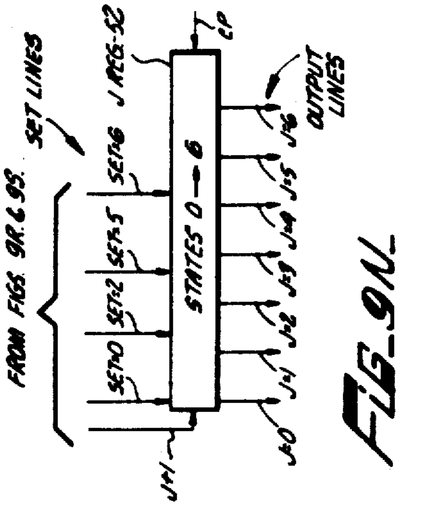
Figure 9O:
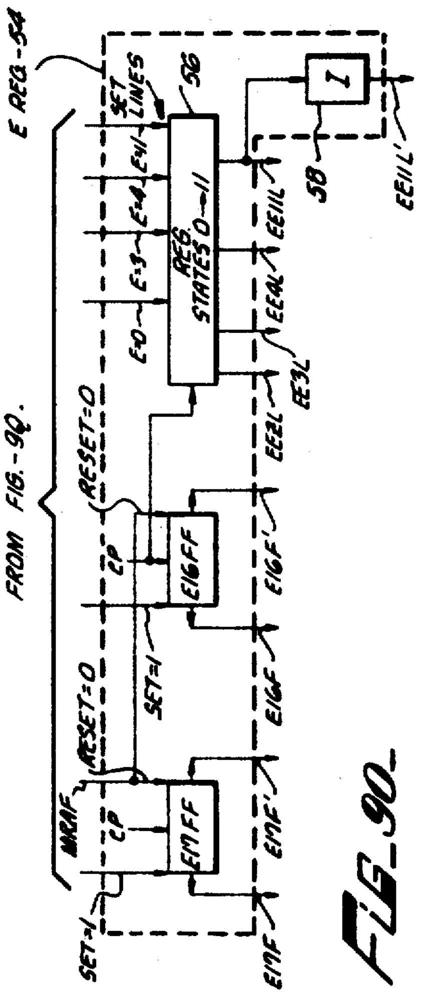

Refer now to FIG. 9O. The FIG. 9O shows a block diagram of the E register 54 along with its input and output circuits. The E register 54 is composed of a register 56 having twelve possible states of operation, referred to as states 0 through 11. In addition, the E register 54 has two flip-flops referenced by the symbols E16FF and E17FF. The register 56 is a flip-flop register with gating circuits (not shown) connected to provide four output circuits. The output circuits are referenced by the symbols EEZL, EE3L, EE4L, and EE11L. When the register is in states 0, 3, 4 and 11, the register 56 develops a control signal at the output circuits EEZL, EE3L, EE4L and EE11L, respectively. In addition, an inverter circuit 58 is provided for generating a control signal at an output circuit referenced by the symbol EE11L' in the absence of a control signal at the output circuit EE11L. The register 56 has four input circuits for setting the state thereof into states corresponding to the four output circuits. The input circuits for setting the register 56 into states 0, 3, 4 and 11 are connected to lines referenced by the symbols set =0, set =3, set =4 and set =11. The gating circuits for controlling the states into which the E register 54 is set are shown in FIG. 9Q and will be described in detail herein below.

FIG. 9N shows a block diagram of the J register 52 with its associated input and output circuits. The J register 52 has seven states of operation referred to as states 0 through 6. Corresponding to each of the states of the J register 52 is an output circuit at which a control signal is developed when the J register 52 is in the correspondingly numbered state of operation. The J register 52 also has five input circuits for receiving set control signals which determine the state into which the J register 52 will be set at a clock pulse. The control lines to the J register 52 are referenced by the symbols set =0, set =2, set =5 and set =6 and when a control signal is applied on these set control lines, the J register 52 is set into the states 0, 2, 5 and 6 respectively. A control line, referenced by the symbols $J+1$ causes the J register 52 to count from one state to the next state of operation in response to a control signal applied thereon. The gates for applying the control signals to the input circuits of the J register 52 are shown in FIG. 9R.

Refer now to FIG. 9M wherein gates shown connected to the output circuits of various registers in the block diagram of FIG. 7 are shown again with the output circuits thereof. The gates shown in FIG. 9M are provided for developing output signals depending on the state of the connected register. The L register 34 is connected to a gate 72 which has two output circuits referenced by the symbols LE3L and LE3L′ for developing control signals when the L register 34 is in state 3 and not in state 3, respectively.

A gate 74 is connected to the output circuit of the G register 12. The gate 74 develops a control signal at output circuits represented by the symbols GEZL, GEZL′ and GE7L when the G register 12 is in a zero state, not in a zero state and in state 7, respectively.

The output circuit of the K register 18 is connected to gate 76 having output circuits referenced by the symbols KE7L and KE7L′. The output circuits KE7L and KE7L′ receive control signals whenever the K register 18 is in state 7 and not in state 7, respectively.

Referring to FIG. 7 an N register 80 is associated with the B register 46. FIG. 11 is a block diagram showing the flip-flops of the K and N registers 18 and 80. As indicated, the K register 18 has three flip-flops. The N register 80 has four flip-flops. To be explained hereinbelow, the destination word is shifted either to the left or right in the B register 46. The word is shifted within the B register 46 three bits (out of a total of 6 bits per character) or a half character at a clock pulse. The N register 80 keeps track of the actual position of the word. The least significant flip-flop NO1FF changes state to keep track of the half character shift whereas the three most significant flip-flops NO8FF, NO4FF and NO2FF change state to indicate a complete character shift. The N register 80 has an output circuit connected to the input circuit of a gate 78. Also, the output circuit of the K register 18 is connected to the gate 78. Referring again to FIG. 9M, the gate 78 has two output circuits referenced by the symbols KENL and KENL′ at which output signals are developed when the state of the flip-flops of the K register 18 are in the same state as the three high order flip-flops (NO8FF, NO4FF, NO2FF) of the N register 80 and the flip-flops of the K register 18 are not in the same states as the three high order flip-flops of the N register 80 control, respectively.

Referring to FIG. 7 the N register 80 has its output circuit connected to the input circuit of the gate 81 which develops an output signal at the HEZL output circuit thereof whenever the register 80 is in a zero state.

Referring again to FIG. 9M, the output circuit of the H register 14 is connected to the input circuit of a gate 82 having two output circuits referenced by the symbols HEZL and HEZL′. The output circuits HEZL and HEZL′ receive control signals whenever the H register 14 is in state zero and not in state zero, respectively.

The T register 40 has its output connected to the input circuit of a gate 84 having four output circuits referenced by the symbols TEZL, TEZL′, TL8L′ and TL8L. The output circuits TEZL, TEZL′, TL8L′ and TL8L receive control signals whenever the T register 40 is in a zero state, not in a zero state, in a state equal to or greater than state eight, and in a state which is less than state 8, respectively.

The V register 20 has its output circuit connected to the input of a gate 86 having output circuits VEZL and VEZL′. The gate 86 develops control signals at the output circuit VEZL and VEZL′ whenever the V register 20 is in state zero and not in state zero, respectively.

The O register 38 has its output circuit connected to the input circuit of a gate 88. The gate 88 has a number of different output circuits. However, for purposes of explanation only three output circuits are shown herein which are referenced by the symbols TSDL, FSSL and RSSL, at which control signals are developed whenever the operator field stored in the O register 38 specifies a transfer source to destination operation, a forward source skip operation or a reverse source skip operation, respectively.

In an actual model of a digital data processor incorporating the present invention the S register 16, as well as the M register 10 and the C register 26, are arranged with flip-flop circuits for storing 15 binary coded bits representative of the address in the memory 24 to be addressed for reading and writing. The first three bits of the address stored in the registers designate one of a possibility of eight memory units from which information is to be read. The remaining 12 bits of the address designate the actual address within the memory. Other details of the memory system are described and claimed in a copending patent application assigned to the same assignee as the present invention entitled Computer Multi-Register Linkage With a Memory Unit and filed on December 3, 1962 and bears the Serial No. 242,002.

FIGS. 9A through 9R show the gating circuits for controlling the operation of the various registers in the data processor 22 of FIG. 7.

Referring to FIG. 7, the S register 16 has a single input circuit referenced by the symbols $S+1$. The S register 16 is responsive to a control signal applied at the input circuit $S+1$ to increase the address portion of the signal stored therein one unit. FIG. 9A shows the gating circuits for providing control signals to the input circuit $S+1$ of the S register 16. The circuit $S+1$ is connected to the output circuit of an OR gate 89. The OR gate 89 has its input circuit connected to AND gates 90, 100 and 102. The AND gate 90 has its input circuits connected to the output circuits TSDL (gate 88, FIG. 9M), $J=0$ (J register 52, FIG. 9N), VEZL′ (gate 86, FIG. 9M), NEZL (gate 81, FIG. 7) and KE7L (gate 76, FIG. 9M). The gate 100 has its input circuits connected to the output circuits TSDL (gate 88, FIG. 9M), $J=3$ (J register 52, FIG. 9N), and MWOF (MWOFF flip-flop FIG. 9P). The AND gate 102 has its input circuits connected to the output circuits TSDL (gate 88, FIG. 9M), $J=6$ (J register 52, FIG. 9N) and MWOF (MWOFF flip-flop FIG. 9P).

Refer now to the B register 46 as shown in FIG. 7. The B register 46 is divided into 16 sections referenced by the symbols B1 through B16. Each of the 16 sections contain three binary coded bits (half of one character consisting of a total of six bits), thereby taking two of the sections for storage of one complete character. Thus the sections B1 and B2 are storage for one character of the destination string of information. The B register 46 has the ability to shift the destination word stored therein three bits at a time either to the left or to the right. The B register 46 has five input control circuits for receiving control signals indicative of the type of shift to be performed by the B register 46. A control signal applied at the B2⊖⊖B16 control circuit causes the characters stored in the B2 through B16 sections of the B register 46 to be shifted one half character to the left as seen in FIG. 7. A control signal at the B1⊖⊖B16 control circuit of the B register 46 causes a half character shift to the left of all characters in the B register 46 with the half character stored in the B16 section shifted around and stored in the B1 section. A control signal applied at the B16⊖⊖B1 control circuit of the B register 46 causes a half character shift of all characters in the B register 46 to the right with the half character stored in the B1 section shifted around and stored in the B16 section. A control signal applied at the B16⊖B1 input circuit of the B register 46 causes the half character stored in the B16 section to be shifted into the B1 section of the B register 46. Similarly, a control signal applied at the B1⊖B16 input circuit of the B register 46 causes the half character stored in the B1 section to be shifted into the B16 section.

Refer now to the gating circuits for applying the control signals at the control circuits of the B register 46 shown in FIG. 9D. The input circuit B1⊖⊖B16 is connected to the output circuit of an OR gate 132. The input circuits B16⊖⊖B1 and B1⊖B16 are connected to the output circuit of an AND gate 138. The input circuit B16⊖B1 is connected to the output circuit of an OR gate 134. The input circuit B2⊖B16 is connected to the output circuit of an AND gate 144.

The OR gate 132 has its input circuits connected to the output circuits of AND gating circuits 136, 140, 142, 146 and 148. The OR gate 134 has its input circuits connected to the output circuits of AND gating circuits 136, 140, and 148. The AND gating circuit 136 has its input circuits connected to the output circuits KENL (gate 78 FIG. 9M), BROF (flip-flop BROFF FIG. 7) and the output circuit of an AND gating circuit 150. The AND gating circuit 150 has its input circuits connected to the output circuits TSDL (gate 88, FIG. 9M), $J=0$ (J register 52 FIG. 9M), and VEZL′ (gate 86, FIG. 9M).

The AND gating circuit 138 has its input circuits connected to the output circuits KO4F (K register 18, FIG. 11), the output circuit of an OR gating circuit 152 and the output circuit of an AND circuit 154. The OR gating circuit 152 has its input circuits connected to the output circuits KENL′ (gate 78, FIG. 9M) and NO1F (N register 80, FIG. 11). The AND gating circuit 154 has its input circuits connected to the output circuits TSDL (gate 88, FIG. 9M), $J=0$ (J register 52, FIG. 9N), BROF (BROFF flip-flop FIG. 7), TEZL′ (gate 84, FIG. 9M), and VEZL (gate 86, FIG. 9M).

The AND gating circuit 142 has its input circuits connected to the output circuits KENL (gate 78, FIG. 9M), NO1F′ (N register 80, FIG. 11), AROF (AROFF flip-flop FIG. 7), HEZL (gate 82, FIG. 9M) and the output circuit of the AND gating circuit 154. The AND gating circuit 144 is connected to the output circuits TSDL (gate 88, FIG. 9M) and $J=2$ (J register 52, FIG. 9N). The AND gating circuit 146 has its input circuits connected to the output circuits TSDL (gate 88, FIG. 9M), $J=5$ (J register 52, FIG. 9N) and the output circuits of an AND gating circuit 156. The AND gating circuit 156 has its input circuits connected to the output circuits TEZL′ (gate 84, FIG. 9M) and EEZL (E register 54, FIG. 9O). The AND gate 148 has its input circuits connected to the output circuits TSDL (gate 88, FIG. 9M) $J=6$ (J register 52, FIG. 9N), EEZL (E register 54), and MWOF′ (MWOFF flip-flop FIG. 9P).

Referring to FIG. 7, a gate 155 is provided in the processing unit 32 and connected as provided between the output of the Y register 44 and an input alignment station of the B register 46. The input alignment station is at the B1 and B2 sections of the B register 46. The input circuit of the gate 155 is referenced by the symbol Y→B1, B2 and is coupled to the output circuit of the AND gate 144 (FIG. 9D). A control signal at the Y→B1, B2 input circuit of the gate 155 causes the character stored in the Y register 44 to be stored in the B1 and B2 sections of the B register 46.

The N register 80 has two control circuits referenced by the symbols $N+1$ and $N-1$. A control signal applied at the $N+1$ input circuit of the N register 80 causes the N register 80 to count up one unit. A control signal at the $N-1$ input circuit of the N register 80 causes the register to count down one unit.

FIG. 11A indicates the direction in which the N register 80 is counted (therefore the contents of the B register 46 are shifted) depending on the state of the K register 18. A purpose of the gates for controlling the direction of counting of the N register 80, and therefore control the direction the destination word is shifted within the B register 46, is to allow the B register to be aligned in the shortest number of steps. It is assumed that the execution of the transfer source to destination operation is always commenced with the B register 46 aligned or the N register 80 in state 0.

FIG. 9B shows the gating circuits for applying the control signals at the input circuits of the N register 80. The $N-1$ input circuit of the N register 80 is connected to the output circuit of AND gating circuit 110. The AND gating circuit 110 has its input circuits connected to the output circuits of an AND gating circuit 112, an OR gating circuit 114 and KO4F (K register 18 FIG. 11). The AND gating circuit 112 has its input circuits connected to the output circuits TSDL (gate 88 FIG. 9M), $J=0$ (J register 52 FIG. 9N) BROF (BROFF flip-flop FIG. 7), TEZL′ (gate 84 FIG. 9M), and VEZL (gate 86 FIG. 9M). The gate 114 has its input circuits connected to the output circuits KENL′ (gate 78 FIG. 9M) and NO1F (N register 80 FIG. 11). The input circuit $N+1$ is connected to the output circuit of an OR gating 116. The OR gating circuit 116 has its input circuits connected to the output circuits of AND gating circuits 120, 122, 124, 126, 128 and 130. The AND gating circuit 120 has its input circuits connected to the output circuits TSDL (gate 88, FIG. 9M), $J=0$ (J register 52, FIG. 9N), VEZL′ (gate 86, FIG. 9M), KENL (gate 78, FIG. 9M), and BROFF (BROFF flip-flop, FIG. 7). The AND gating circuit 122 has its input circuits connected to the output circuits KO4F′ (K register 18, FIG. 11) KENL′ (gate 78 FIG. 9M) and the output circuit of the AND gating circuit 112. The AND gating circuit 124 has its input circuits connected to the output circuits KENL (gate 78 FIG. 9M), NO1F′ (N register 80, FIG. 11) AROF (AROFF flip-flop FIG. 7), HEZL (gate 82 FIG. 9M) and the output circuit of the gate 112. The AND gate 126 has its input circuits connected to the output circuits TSDL (gate 88 FIG. 9M) and $J=2$ (J register 52 FIG. 9N). The AND gate 128 has its input circuits connected to the output circuits TSDL (gate 88 FIG. 9M), $J=5$ (J register 52 FIG. 9N), TEZL′ (gate 84 FIG. 9M) and EEZL (E register 54 FIG. 9O). The AND gating circuit 130 has its input circuits connected to the output circuits TSDL (gate 88 FIG. 9M), $J=6$ (J register 52 FIG. 9N), EEZL (E register 54 FIG. 9O) and MWOF′ (MWOFF flip-flop FIG. 9P).

Refer now to the K register 18 as shown in FIG. 7. The K register 18 has a control circuit referenced by the symbol $K+1$. Whenever a control signal is applied at the control circuit $K+1$, the K register 18 counts up one unit. FIG. 9C shows the gating circuits for applying the control signal at the input circuit $K+1$ of the K register 18. The input circuit $K+1$ is connected to the output circuit of an OR gating circuit 104 having input circuits connected to AND gating circuits 106 and 108. The AND gating circuit 106 has its input circuits connected to the output circuits TSDL (gate 88 FIG. 9M), $J=0$ (K register 52 FIG. 9N) and VEZL' (gate 86 FIG. 9M). The AND gate 108 has its input circuits connected to the TSDL and $J=2$ output circuits similar to the AND gate 106.

Selection gating circuits 109 and 111 are connected to the output circuits of the A register 42 and the P register 36. The selection circuits 109 and 111 operate under the control of the G register 12 and the L register 34 for gating out the character and syllable indicated by the states of the registers.

With reference to FIG. 7 it will be noted that a gate 119 is coupled between the selection circuit 109 and the input circuit of the Y register 44. The gate 119 has a control circuit referenced by the symbol A→Y. Whenever a control signal is applied at the A→Y control circuit of the gate 119, the characters specified by the state of the G register 12 are stored in the Y register 44.

Referring again to FIG. 9B, it will be noted that the control circuit A→Y of the gate 119 is coupled to the output circuit of an OR gate 118. The OR gate 118 has its input circuits connected to the output circuits of the AND gates 124 and 128.

Flip-flops are used for indicating whether an associated register is occupied and for other timing purposes in the data processor 22. Associated with the B register 46 the A register 42 and the P register 46 are the occupancy flip-flops referenced by the symbols BROFF, AROFF and PROFF. FIG. 9E shows the gating circuits for triggering the BROFF flip-flop into "0" and "1" states. The input circuits of the BROFF flip-flop for controlling the setting thereof into a "0" state is connected to the output circuit of an AND gate 158. The AND gate 158 has its input circuits connected to the output circuits TSDL (gate 88 FIG. 9M) $J=0$ (J register 52 FIG. 9N), VEZL' (gate 86 FIG. 9M) and KE7L (K register 18 FIG. 11). The input circuit of the BROFF flip-flop for controling the setting thereof into a "1" state is connected to the output circuit of an AND gate 160. The AND gating circuit 160 has its input circuits connected to the output circuits TSDL (gate 88 FIG. 9M), $J=1$ (J register 52 FIG. 9N), MROF (MROFF flip-flop FIG. 9P).

The V register 20 and the H register 14 each have input circuits for controlling the setting thereof into a zero state. The V and H registers 20 and 14 are only in non-zero states if set into other states during the execution operators not described herein and which need not be explained for a complete understanding of the invention. The H and V registers 14 and 20 are shown herein for timing purposes only. Referring to FIG. 9F, the control circuits of the V register for controlling the setting thereof into a "0" state are connected to the output circuits of an OR gating circuit 162 having input circuits connected to the output circuits of gates 164 and 166. The gating circuit 164, an AND gating circuit, has its input circuits connected to the output circuits $J=0$ (J register 52 FIG. 9N) and TSDL (gate 88, FIG. 9M). The gate 166, an OR gating circuit, has its input circuits connected to the output circuits RSSL and FSSL (gate 88 FIG. 9M).

The M register 10 has two control circuits. One of the input circuits of the M register 10 is referenced by the symbol $M-1$ and causes the M register 10 to count down one unit in response to a control signal applied thereto. The other control circuit of the M register 10 is referenced by the symbol $M+1$ and causes the M register 10 to count up one unit in response to a control signal applied thereto.

FIG. 9G is a schematic diagram showing the gating circuits for applying the control signals to the input circuits of the M register 10. The $M+1$ input circuit of the M register 10 is connected to the output circuit of an OR gate 168. The OR gate 168 has its input circuits connected to the output circuits of AND gating circuits 172, 174 and 176 and an OR gating circuit 178.

The AND gating circuit 172 has its input circuits connected to the output circuits TSDL (gate 88 FIG. 9M), $J=O$ (J register 52 FIG. 9N), HEZL' (gate 82 FIG. 9M) and GE7L (gate 74 FIG. 9M). The AND gate 174 has its input circuits connected to the output circuits TSDL (gate 88 FIG. 9M), $J=2$ (J register 52 FIG. 9N), KE7L' (gate 76 FIG. 9M) and GE7L (gate 74 FIG. 9M). The AND gating circuit 176 has its input circuits connected to the output circuits TSDL (gate 88 FIG. 9M), $J=3$ (J register 52 FIG. 9N), MWOF (MWOFF flip-flop FIG. 9P), and GEZL (gate 74 FIG. 9M).

The OR gating circuit 178 has its input circuits connected to the output circuits of AND gating circuits 180 and 184. The AND gating circuit 180 has its input circuits connected to the output circuits GE7L (gate 74 FIG. 9M) and HEZL' (gate 82 FIG. 9M) and an OR gating circuit 186. The OR gating circuit 186 has its input circuits connected to the output circuits FSSL (gate 88 FIG. 9M) and the output circuit of an AND gating circuit 188. The AND gating circuit 188 has its input circuits connected to the output circuits TEZL (gate 84 FIG. 9M) and RSSL (gate 88 FIG. 9M). The AND gating circuit 184 has its input circuits connected to the output circuits of an AND gating circuit 190 and an OR gating circuit 194. The AND gating circuit 190 has its input circuits connected to the output circuits FSSL (gate 88 FIG. 9M) and the output circuit of an AND gating circuit 192. The AND gating circuit 192 has its input circuits connected to the output circuits TEZL' (gate 84 FIG. 9M) and HEZL (gate 82 FIG. 9M). The OR gating circuit 194 has its input circuits connected to the output circuits GEZL (gate 74 FIG. 9M) and TL8L' (gate 84 FIG. 9M).

The input circuit $M-1$ is connected to the output circuit of an AND gating circuit 170. The AND gating circuit 170 has its input circuits connected to the output circuits RSSL (gate 88 FIG. 9M) an OR gating circuit 196 and the output circuit of the AND gating circuit 192. The OR gating circuit 196 has its input circuits connected to the output circuits GE7L (gate 74 FIG. 9M) and TL8L' (gate 84 FIG. 9M).

An OR gate 198 is provided having its input circuits connected to the output circuit of the AND gate 180 and OR gate 195. The OR gate 195 has its input circuits connected to the output circuits of AND gates 197 and 199 and the output circuit TL8L'. The AND gate 199 has its input circuits connected to the output circuits RSSL and GEZL1 (FIG. 9M). The AND gate 197 has its input circuits connected to the output circuits FSSL and GE7L (FIG. 9M). The output circuit of the OR gating circuit 198 is connected to the input circuit of a gate 200 of the FIG. 9I.

Referring now to FIG. 9I, the output circuit of the OR gating circuit 200 is connected to the input circuit of the AROFF flip-flop for controlling the setting thereof into a "0" state.

The other input circuit of the OR gating circuit 200 is connected to the output circuit of the AND gating circuit 172 (FIG. 9G). The input circuit of the AROFF flip-flop for controlling the setting thereof into a one state is connected to the output circuit of an AND gating circuit 204. The AND gating circuit 204 has its input circuits connected to the output circuits TSDL (gate 88, FIG. 9M), $J=0$ (J register 52 FIG. 9N) and MROF (MROFF flip-flop FIG. 9P).

Refer now to the G register 12 as shown in FIG. 7. The G register 12 has two control circuits represented by the symbols $G+1$ and $G-1$. A control signal applied to the control circuit $G+1$ causes the state of the G register 12 to increase by one unit. A control signal applied to the control circuit $G-1$ causes the G register 12 to decrease the state thereof by one unit in response to each clock pulse. Thus the G register 12 is a counting circuit. FIG. 9H shows the gating circuits for applying the control signals to the control circuits of the G register 12. The input circuits $G+1$ and $G-1$ are connected to the output circuits of an OR gating circuit 206 and an AND gating circuit 207. The OR gating circuit 206 has its input circuits connected to the output circuits of AND gating circuits 208 and 210 and an OR gating circuit 212. The AND gating circuit 208 has its input circuits connected to the output circuits TSDL (gate 88 FIG. 9M), $J=0$ (J register 52 FIG. 9N), and HEZL' (gate 82 FIG. 9M). The AND gate 210 has its input circuits connected to the output circuits TSDL (gate 88 FIG. 9M) and $J=2$ (J register 52 FIG. 9N).

The OR gating circuit 212 has its input circuits connected to the output circuits of AND gating circuits 214 and 216. The AND gating circuit 214 has its input circuit connected to the output circuit HEZL' (gate 82 FIG. 9M) and the output of an OR gating circuit 217. The OR gating circuit 217 has its input circuits connected to the output circuit FSSL (gate 88 FIG. 9M) and the output circuit of an AND gating circuit 220. The AND gating circuit 220 has its input circuits connected to the OUTPUT circuits TEZL and RSSL (gate 88 FIG. 9M). The AND gating circuit 216 has its input circuits connected to the output circuit of an AND gating circuit 218 and the output circuits FSSL (gate 88 FIG. 9M) and TL8L (gate 84 FIG. 9M). The AND gating circuit 218 has its input circuits connected to the output circuits of an OR gating circuit 222 and an AND circuit 224. The OR gating circuit 222 has its input circuits connected to the output circuits FSSL and RSSL (gate 88 FIG. 9M). The AND gating circuit 224 has its input circuits connected to the output circuits TEZL' (gate 84 FIG. 9M) and HEZL (gate 82 FIG. 9M).

The AND gating circuit 207 has its input circuits connected to the output circuit of the AND gating circuit 218 and the output circuits RSSL (gate 88 FIG. 9M) and TL8L (gate 84 FIG. 9M).

Refer now to the L register 34 shown in FIG. 7. The L register 34, is a program syllable counter and has a control circuit represented by the symbol $L+1$. The L register 34 has four states of operation and is responsive to a control signal applied at the control circuit thereof for increasing the state thereof one unit. Thus, the L register 34 is actually a counter and counts the program instruction syllables stored in the program register 36.

Refer now to FIG. 9J wherein the gating circuit for applying the control signals to the control circuit $L+1$ of the L register 34 is shown. The input circuit $L+1$ is connected to the output circuit of an AND gating circuit 226. The AND gating circuit 226 has its input circuits connected to the output circuits PROF' (PROFF flip-flop FIG. 7), TROF (TROFF flip-flop FIG. 9P), ICFL' (gate 330, FIG. 9S) and E16F' (E register 54 FIG. 9O).

FIG. 9K shows the gating circuits for controlling the setting of the PROFF flip-flop (FIG. 7) into its "0" and "1" states. The input circuits of the TROFF flip-flop for controlling the setting thereof into a "1" state is connected to the output circuit of an OR gating circuit 228. The OR gating circuit 228 has its input circuits connected to the output circuit MRAF (MRAFF flip-flop FIG. 9P) and the output circuit of an AND gating circuit 230. The AND gating circuit 230 has its input circuits connected to the output circuit of an AND gating circuit 232 and the output circuits ICFL' (gate 330, FIG. 9S), E16F' (E register 54 FIG. 9O) and LE3L' (gate 72 FIG. 9M). The AND gating circuit 232 has its input circuits connected to the output circuits PROF' (PROFF flip-flop FIG. 7) and TROF (TROFF flip-flop FIG. 9P).

The input circuit of the PROFF flip-flop for controlling the setting thereof into a "0" state is connected to the output circuit of an OR gating circuit 234. The OR gating circuit 234 has its input circuits connected to the output circuits SECL (gate 338 FIG. 9T) and the output circuits of an AND gating circuit 236. The AND gating circuit 236 has its input circuits connected to the output circuits $J=0$ (J register 52 FIG. 9M) PROF (PROFF flip-flop FIG. 7) and TROF' (TROFF flip-flop FIG. 9P).

Referring to FIG. 7, it will be noted that a gate 242 couples the output circuit of the selection circuit 111 to the input circuit of the O and T registers 38 and 40. The gating circuit 242 has a control circuit represented by the symbol P → O,T. A control signal applied at the control circuit P → O,T of the gate 242 causes the syllable stored in the P register 36 and specified by the state of the L register 34 to be stored in the O and T registers 38 and 40.

Referring again to FIG. 9K, it will be noted that the control circuit P → O,T is connected to the output circuit of an OR gating circuit 238. The OR gating circuit 238 has its input circuits connected to the output circuits of an AND gating circuit 240 and the AND gating circuit 236. The AND gating circuit 240 has its input circuits connected to the output circuits PROF (PROFF flip-flop FIG. 7) and SECL (gate 338 FIG. 9T).

Refer now to the T register 40 shown in FIG. 7. The T register 40 has two control circuits represented by the symbols T1 and T8. A control signal applied at the control circuit T1 causes the T register 40 to decrease the state thereof by one unit. A control signal applied at the control circuit T8 causes the T register 40 to decrease the state thereof by 8 units. Thus, the T register 40 is a counter as well as a storage register.

FIG. 9L shows the gates for generating the control signals for the T register 40. The T1 input circuit of T register 40 is connected to the output circuit of an OR gating circuit 242. The OR gating circuit 242 is connected to the output circuits of an AND gating circuit 245 and an OR gating circuit 246. The AND gating circuit 245 has its input circuits connected to the output circuit TSDL (gate 88 FIG. 9M), $J=2$ (J register 52 FIG. 9N) and BROF (BROFF flip-flop FIG. 7). The OR gating circuit 246 has its input circuits connected to the output circuits of AND gating circuits 248 and 250. The AND gating circuit 250 has its input circuit connected to the output circuit of an AND gating circuit 252 and the output circuit TL8L (gate 84 FIG. 9M). The AND gating circuit 252 has its input circuits connected to the output circuits TEZL' (gate 84 FIG. 9M) and HEZL (gate 82 FIG. 9M)and the output circuits of an OR gating circuit 253. The OR gating circuit 253 has its input circuits connected to the output circuits RSSL and FSSL (gate 88 FIG. 9M). The AND gating circuit 250 has its input circuits connected to the output circuits HEZL' (gate 82 FIG. 9M) RSSL (gate 88 FIG. 9M) and TEZL' (gate 84 FIG. 9M).

The input circuit T–8 of the T register 40 is connected to the output circuit of an AND gating circuit 244. The AND gating circuit 244 has its input circuits connected to the output circuit of the AND gating circuit 252 and the output circuit TL8L' (gate 84 FIG. 9M).

Figures 9P, 9S, 9T:
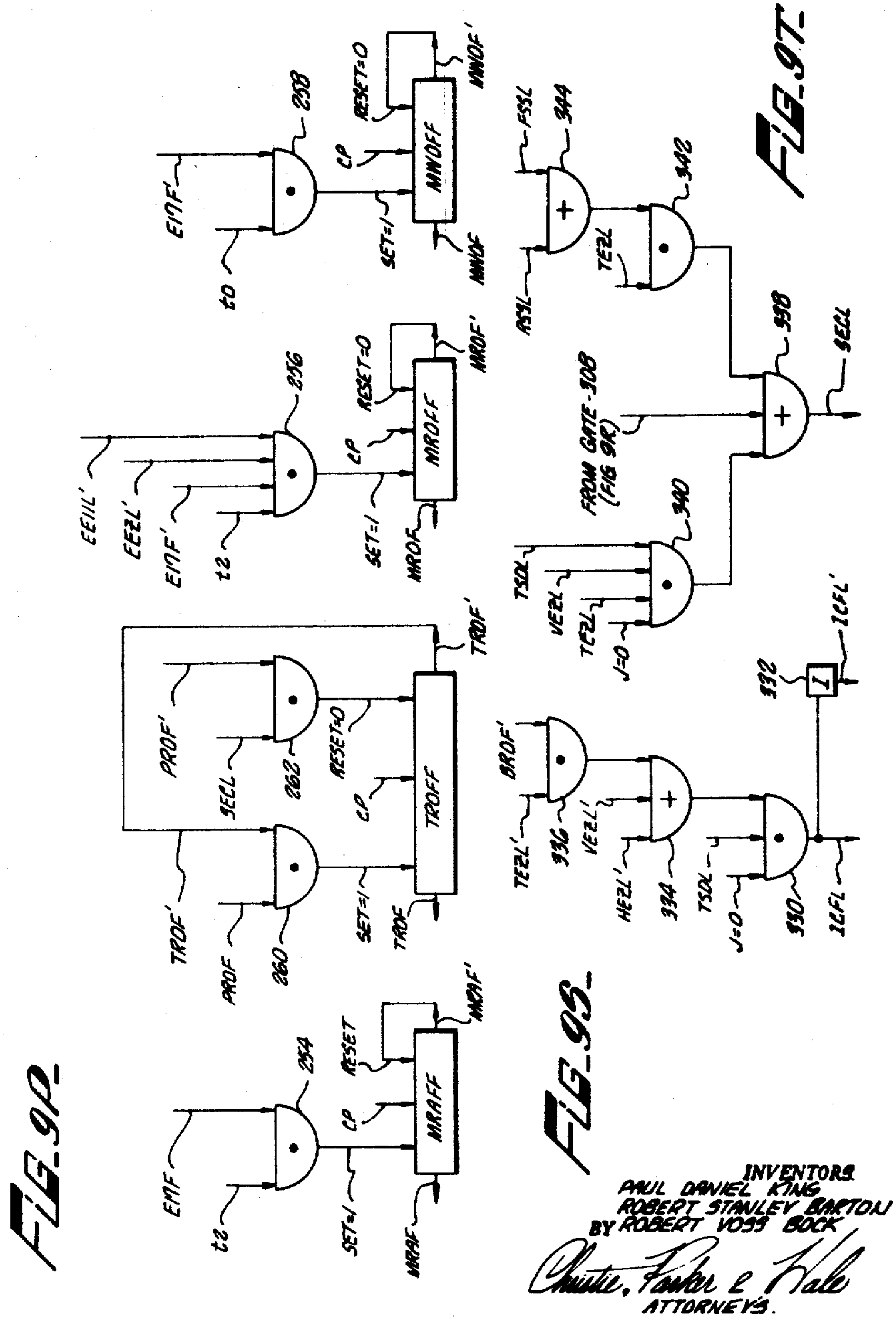
Figure 9Q:
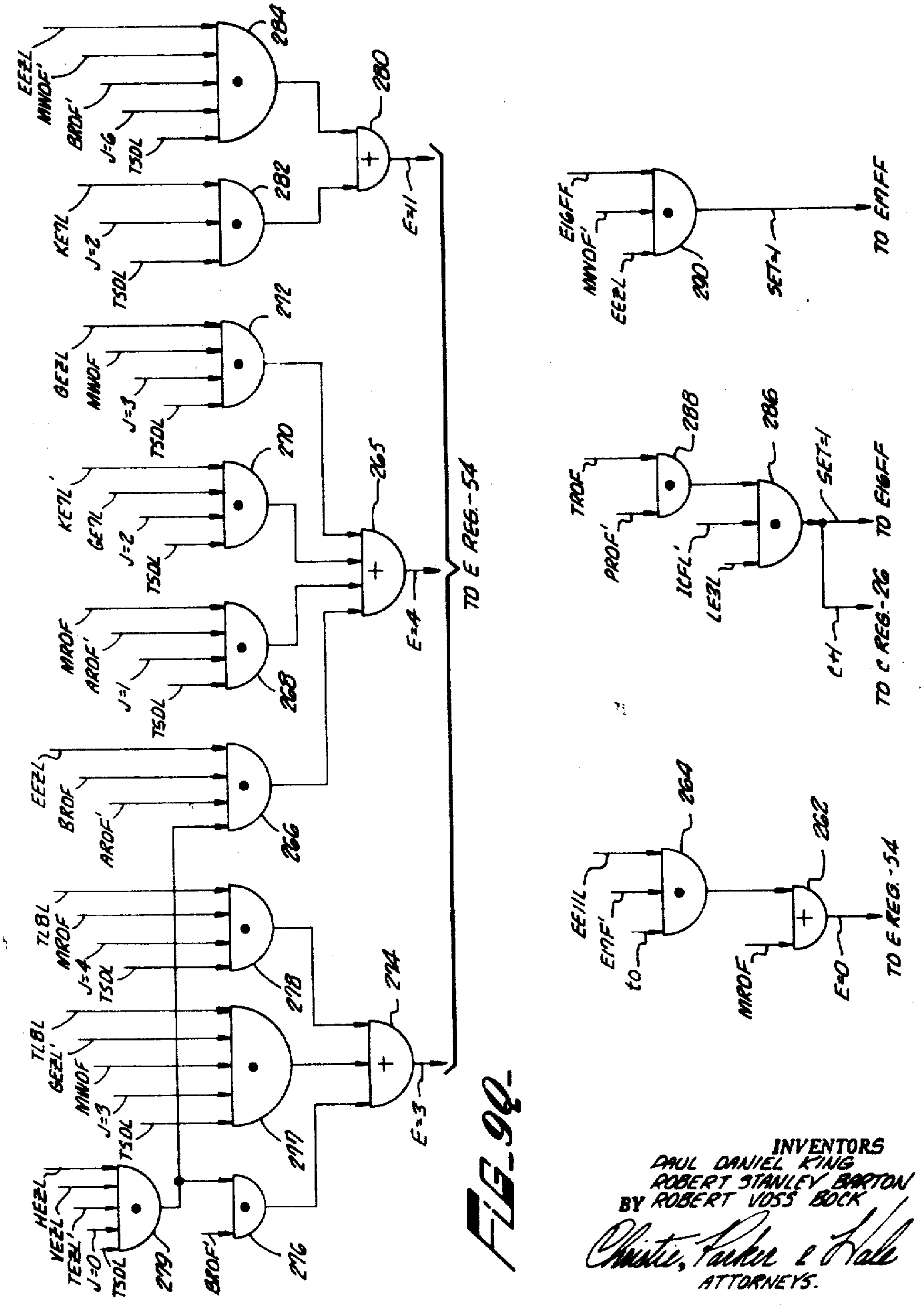
Figure 9R:
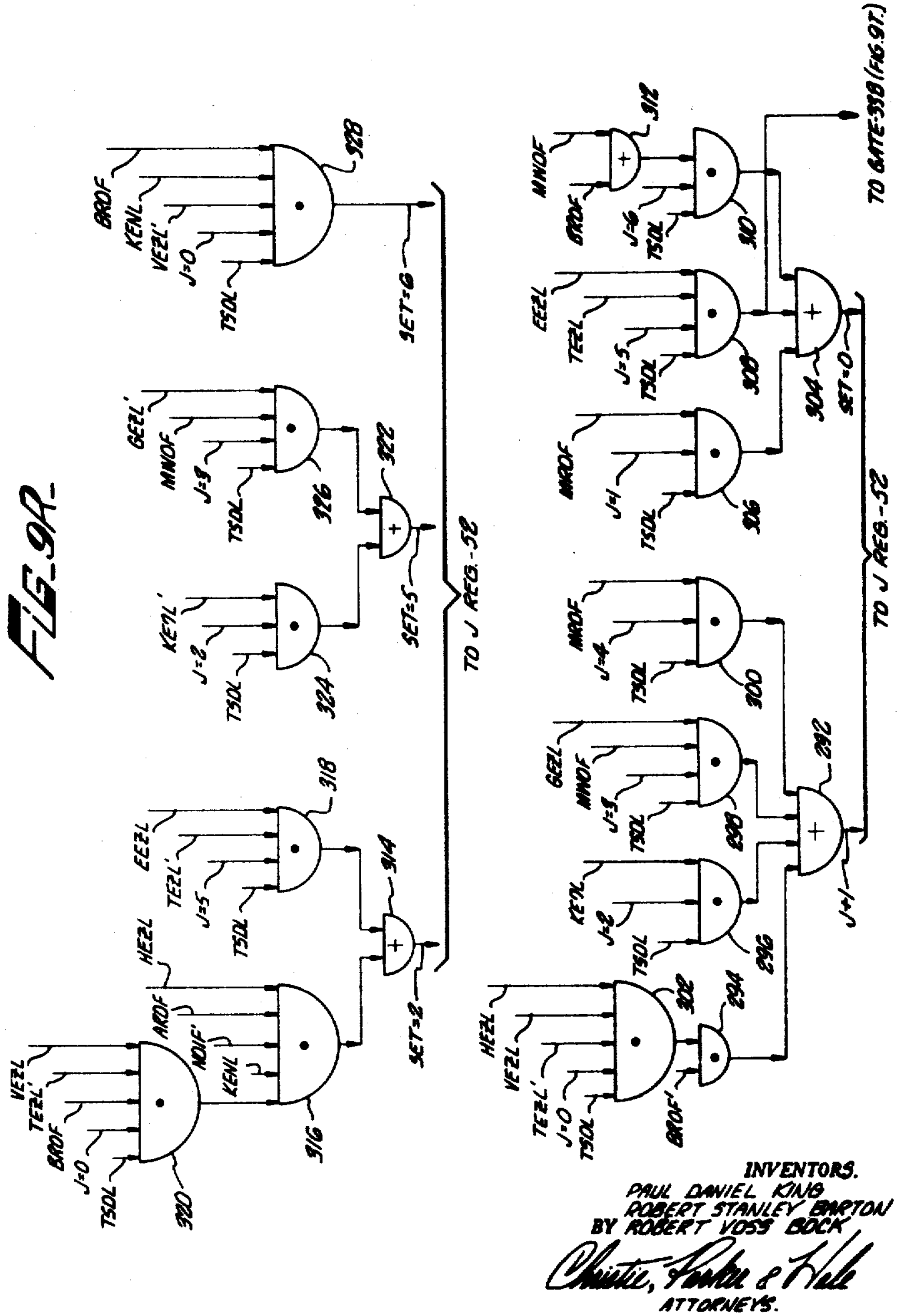

Refer now to the schematic diagram of FIG. 9P showing the gating circuits for the timing flip-flops of the timing unit 50. The MRAFF flip-flop has its input circuit for controlling the setting thereof into a "1" state connected to the output circuit of an AND gating circuit 254. The AND gating circuit 254 has its input circuit connected to the output circuit *t*2 (see FIG. 8) and E17F (E register 54 FIG. 9O). The input circuit of the MRAFF flip-flop for controlling the resetting thereof into a "0" state is connected to the MRAF' output circuit thereof.

The input circuit of the MROFF flip-flop for controlling the setting thereof into a "1" state is connected to the output of an AND gating circuit 256. The AND gating circuit 256 has its input circuits connected to the output circuits *t*2 (see FIG. 8), E17F' (E register 54 FIG. 9O), EEZL' (E register 54 FIG. 9O) and EE11L' (E register 54 FIG. 9O). The input circuit of the MROFF flip-flop for controlling the resetting thereof into a zero state is connected to the MROF' output circuit thereof.

The MWOFF flip-flop has its input for controlling the setting thereof into a "1" state connected to the output circuit of an AND gating circuit 258. The AND gating circuit 258 has its input circuit connected to the output circuits *t2* (see FIG. 8) and E17F′ (E register 54 FIG. 9O). The input circuit of the MWOFF flip-flop for controlling the resetting thereof into a "0" state is connected to the MWOF′ output circuit thereof.

The TROFF flip-flop has its input circuits for controlling the setting thereof into "1" and "0" states connected to the output circuits of AND gating circuits 260 and 262 respectively. The AND gating circuit 260 has its input circuits connected to the output circuits PROF (PROFF flip-flop FIG. 7) and TROF′. The AND gating circuit 262 has its input circuits connected to the output circuits SECL (gate 338 FIG. 9T) and PROF′ (PROFF flip-flop FIG. 7).

Refer now to the schematic diagram of FIG. 9Q wherein the gating circuits for controlling the setting of the E register into its various states of operation are shown. The control circuit $E=0$ of the E register 54 is connected to the output circuit of an OR gating circuit 262. The OR gating circuit 262 has its input circuits connected to the output circuits MROF (MROFF flip-flop FIG. 9P) and the output circuit of an AND gating circuit 264. The AND gating circuit 264 has its input circuits connected to the output circuits *t0* (see FIG. 8), E17F′ (E register 54 FIG. 9O), and EE11L (E register 54 FIG. 9O).

The control circuit $E=3$ of the E register 54 is connected to the output circuit of an OR gating circuit 274. The OR gating circuit 274 has its input circuits connected to the output circuits of AND gating circuits 276, 277 and 278. The AND gating circuit 276 has its input circuits connected to the output circuit BROF′ (BROFF flip-flop FIG. 7) and the output circuit of an AND gating circuit 279. The AND gating circuit 279 has its input circuits connected to the output circuits TSDL (gate 88 FIG. 9M), $J=0$ (J register 52 FIG. 9N) TEZL′ (gate 84 FIG. 9M) VEZL (gate 86 FIG. 9M), and HEZL (gate 82 FIG. 9M). The AND gating circuit 277 has its input circuits connected to the output circuits TSDL (gate 88 FIG. 9M), $J=3$ (J register 52 FIG. 9N), MWOF (MWOFF flip-flop FIG. 9P), GEZL′ (gate 74 FIG. 9M) and TE8L (E register 54 FIG. 9O). The AND gating circuit 278 has its input circuits connected to the output circuits TSDL (gate 88 FIG. 9M), $J=4$ (J register 52 FIG. 9N), MROF (MROFF flip-flop FIG. 9P) and TL8L (gate 84 FIG. 9M).

The $E=4$ input of the E register 54 is connected to the output circuits of the AND gating circuits 266, 268, 270 and 272. The AND gating circuit 266 has its input circuit connected to the output circuits of the AND gating circuit 279 and the output circuits AROF′ (AROFF flip-flop FIG. 7), BROF (BROFF flip-flop FIG. 7) and EEZL (E register 54 FIG. 9O). The AND gating circuit 268 has its input circuits connected to the output circuits TSDL (gate 88 FIG. 9M), $J=1$ (J register 52 FIG. 9N), AROF′ (AROFF flip-flop FIG. 7) and MROF (MROFF flip-flop FIG. 9P). The input circuits of the AND gating circuit 270 are connected to the output circuits TSDL (gate 88 FIG. 9M), $J=2$ (J register 52 FIG. 9N), GE7L (gate 74, FIG. 9M), and KE7L′ (gate 76, FIG. 9M). The AND gating circuit 272 has its input circuits connected to the output circuits TSDL (gate 88 FIG. 9M), $J=3$ (J register 52 FIG. 9N), MWOF (MWOFF flip-flop FIG. 9P), and GEZL (gate 74 FIG. 9M).

The control circuit $E=11$ of the E register 54 is connected to the output circuit of an OR gating circuit 280. The OR gating circuit 280 has its input circuits connected to the output circuits of AND gating circuits 282 and 284. The AND gating circuit 282 has its input circuits connected to the output circuits TSDL (gate 88 FIG. 9M), $J=2$ (J register 52 FIG. 9N), and KE7L (gate 76 FIG. 9M). The AND gating circuit 284 has its input circuits connected to the output circuits TSDL (gate 88 FIG. 9M), $J=6$ (J register 52 FIG. 9N), BROF′ (BROFF flip-flop FIG. 7) MWOF′ (MWOFF flip-flop FIG. 9P) and EEZL (E register 54 FIG. 9O).

The input circuit of the flip-flop E16FF controlling the setting thereof into a "1" state is connected to the output circuit of an AND gating circuit 286. The AND gating circuit 286 has its input circuits connected to the output circuits LE3L (gate 72 FIG. 9N) and ICFL′ (inverter circuit 132 FIG. 9S) and the output circuit of an AND gating circuit 288. The AND gating circuit 288 has its input circuits connected to the output circuits PROF′ (PROFF flip-flop FIG. 7) and TROF (TROFF flip-flop FIG. 9P).

The input circuit of the E17FF flip-flop for controlling the setting thereof into a "1" state is connected to the output circuit of an AND gating circuit 290. The AND gating circuit 290 has its input circuits connected to the output circuits EEZL (E register 54 FIG. 9O), MWOF′ (MWOFF flip-flop FIG. 9P), and E16FF (E register 54 FIG. 9O). The C register 26 has a control signal referenced by the symbol $C+1$. A control signal applied at the control circuit $C+1$ causes the C register 26 to increase the address portion thereof one unit. The $C+1$ control circuit is connected to the output circuit of the AND gating circuit 286 of FIG. 9Q.

Refer now to FIG. 9R wherein the gating circuits for applying control signals at the control circuits of the J register 52 are shown. The control circuits $J+1$ of the J register 52 is connected to the output circuit of an OR gating circuit 292. The OR gating circuit 292 has its input circuits connected to the output circuits of AND gating circuits 294, 296, 298 and 300. The AND gating circuit 294 has its input circuits connected to the output circuits BROF′ (BROFF flip-flop FIG. 7) and the output circuit of an AND gating circuit 302. The AND gating circuit 302 has its input circuits connected to the output circuits TSDL (gate 88 FIG. 9M), $J=0$ (J register 52 FIG. 9N), TEZL′ (gate 84 FIG. 9M), VEZL (gate 86, FIG. 9M), and HEZL (gate 82 FIG. 9M). The AND gating circuit 296 has input circuits connected to the output circuits TSDL (gate 88 FIG. 9M), $J=2$ (J register 52 FIG. 9N), and KE7L (gate 76 FIG. 9M). The AND gating circuti 298 has its input circuits connected to the output circuits TSDL (gate 88 FIG. 9M), $J=3$ (J register 52 FIG. 9N), MWOF (MWOFF flip-flop FIG. 9P) and GEZL (gate 74 FIG. 9M). The AND gating circuit 300 is connected to the output circuits TSDL (gate 88 FIG. 9M), $J=4$ (J register 52 FIG. 9N), and MROF (MROFF flip-flop FIG. 9P).

The input circuit set $=0$ of the J register 52 is connected to the output circuit of an OR gating circuit 304. The OR gating circuit 304 has its input circuits connected to the output circuits of AND gating circuits 306, 308 and 310. The AND gating circuit 306 has its input circuits connected to the output circuits TSDL (gate 88 FIG. 9M), $J=1$ (J register 52 FIG. 9N), and MROF (MROFF flip-flop FIG. 9P). The AND gating circuit 308 has its input circuits connected to the output circuits TSDL (gate 88 FIG. 9M), $J=5$ (J register 52 FIG. 9N), TEZL (Gate 84 FIG. 9M), and EEZL (E register 54 FIG. 9O). The AND gating circuit 310 has its input circuits connected to the output circuits TSDL (gate 88 FIG. 9M) and $J=6$ (J register 52 FIG. 9N) and the output circuit of an OR gating circuit 312. The OR gating circuit 312 has its input circuits connected to the output circuit BROF (BROFF flip-flop FIG. 7) and MWOF (MWOFF flip-flop FIG. 9P).

The input circuit set $=2$ of the J register 52 is connected to the output circuit of an OR gating circuit 314. The OR gating circuit 314 has its input circuits connected to the output circuits of AND gating circuits 316 and 318. The AND gating circuit 316 has its input circuits connected to the output circuit of an AND gating circuit 320 and the output circuits KENL (gate 78 FIG. 9M), NO1F' (N register 80 FIG. 11), AROF (AROFF flip-flip FIG. 7), and HEZL (gate 82 FIG. 9M). The AND gating circuit 320 has its input circuits connected to the output circuits TSDL (gate 88 FIG. 9M), $J=0$ (J register 52 FIG. 9N), BROF (BROFF flip-flop FIG. 7), TEZL' (gate 84 FIG. 9M), and VEZL (gate 86 FIG. 9M). The AND gating circuit 318 has its input circuits connected to the output circuits TSDL (gate 88 FIG. 9M), $J=5$ (J register 52 FIG. 9N), TEZL' (gate 84 FIG. 9M), and EEZL (E register 54 FIG. 9O).

The control circuit set =5 of the J register 52 is connected to an OR gate 322 having input circuits connected to AND gating circuits 324 and 326. The AND gating circuit 324 has its input circuits connected to the output circuits TSDL (gate 88 FIG. 9M), $J=2$ (J register 52 FIG. 9N), and KE7L' (gate 76 FIG. 9M). The AND gating circuit 326 has its input circuits connected to the output circuits TSDL (gate 88 FIG. 9M), $J=3$ (J register 52 FIG. 9N), MWOF (MWOFF flip-flop FIG. 9P), and GEZL' (gate 74 FIG. 9M).

The control circuit set =6 of the J register 52 is connected to the output circuit of an AND gating circuit 328. The AND gating circuit 328 has its input circuits connected to the output circuits TSDL (gate 88, FIG. 9M), $J=0$ (J register 52 FIG. 9N), VEZL' (gate 86 FIG. 9M), KENL (gate 78 FIG. 9M), and BROF (BROFF flip-flop FIG. 7).

Refer now to FIG. 9S. The output circuit ICFL is connected to the output circuit of an AND gating circuit 330. The AND gating circuit 130 has its input circuits connected to the output circuits $J=0$ (J register 52 FIG. 9N) and TSDL (gate 88 FIG. 9M) and the output circuit of an OR gating circuit 334. The OR gating circuit 334 has its input circuits connected to the output circuits HEZL' (gate 82 FIG. 9M) and VEZL' (gate 86 FIG. 9M) and the output circuit of an AND gating circuit 336. The AND gating circuit 336 has its input circuits connected to the output circuits TEZL' (gate 84 FIG. 9M) and BROF' (BROFF flip-flop FIG. 7). The output circuit represented by the symbol ICFL' is connected to the output circuit of an inverter circuit 332 having an input circuit connected to the output circuit of the AND gating circuit 330.

Refer now to FIG. 9T wherein the gating circuits for providing control signals at the output circuit SECL is shown. The output circuit SECL is connected to the output circuit of an OR gating circuit 338. The OR gating circuit 338 has its input circuits connected to the output circuits of AND gating circuits 340, 308 (FIG. 9R) and 342. The AND gating circuit 340 has its input circuits connected to the output circuits $J=0$ (J register 52 FIG. 9N), TEZL (gate 84 FIG. 9M), VEZL (gate 86 FIG. 9M), and TSDL (gate 88 FIG. 9M). The AND gating circuit 342 has its input circuits connected to the output circuits TEZL (gate 84 FIG. 9M) and the output circuit of an OR gating circuit 344. The OR gating circuit 344 has its input circuits connected to the output circuits RSSL and FSSL (gate 88 FIG. 9M).

With the circuits of the timing unit 50 in mind, refer now to FIG. 8 wherein a schematic diagram, partly in block diagram form, is shown of the memory unit 24 and the associated input and output circuits in the processor 22. Referring to the memory unit 24, a magnetic core memory unit 346 is provided having a memory address register (MAR) 350 and a memory information register (MIR) 348. The addresses for addressing the magnetic core memory 346 are stored in the memory address register 350. The words to be written in the core memory 346 and words read out of the memory 346 are stored in the memory information register 348. A counter 352 provides timing signals to the magnetic core memory 346 and to other gating circuits in the timing unit 50 described hereinabove. The counter 352 has six possible states of operation and corresponding thereto six output circuits represented by the symbols $t0$, $t1$, $t2$, $t3$, $t4$, and $t5$. Whenever the counter is in states 0 through 5, control signals are developed at the output circuits $t0$ through $t5$, respectively. The counter 352 is connected to the CP output circuit of the source of clock pulses 53. When counter 352 is in any one of the states zero through four, a clock pulse causes the counter 352 to count to the next state of operation. When the counter 352 is in state four, the next clock pulse causes the counter to count back to the initial state five where it remains until a signal is applied at the control circuit thereof connected to an AND gating circuit 354. When the AND gating circuit 354 applies a control signal to the counter 352, the next clock pulse causes the counter 352 to count into state 1 and then sequentially count through the states as described above. The AND gating circuit 354 has its input circuits connected to the output circuit of an OR gating circuit 356 and the $t5$ output circuit of the counter 352. The OR gating circuit 356 has its input circuits connected to the output circuits EEZL' (E register 54 FIG. 9O) and E17F (E register 54 FIG. 9O).

The C, S, and H registers 26, 16, and 10 are connected to gates 358, 360, and 362. The gates 358, 360, and 362 have control circuits connected to the output circuit of AND gating circuits 364, 366, and 368, respectively.

The AND gate 364 has its input circuit connected to the output circuits E17F (E register 54 FIG. 9O), EEZL (E register 54 FIG. 9O), and to (counter 352). The AND gating circuit 366 has its input circuits connected to the output circuits $t0$ (counter 352) and E17F' (E register 54 FIG. 9O) and the output circuit of an OR gating circuit 370. The OR gating circuit 370 has its input circuits connected to the output circuits EE11L and EE3L (E register 54 FIG. 9O). The AND gating circuit 368 has its input circuits connected to the output circuits $t0$ (counter 352) EE4L and E17F' (E register 54 FIG. 9O).

Whenever control signals are applied at the input circuits of the gates 358, 360, and 362 by their respective gating circuits, the address stored in the C, S, and M registers 26, 16, and 10 are stored in the memory address register 350.

The output circuits of the memory information register 348 is connected through gating circuits 370, 374, and 376 to the input circuits of the P, A, and B registers 36, 42, and 46, respectively. The gate 372 has a control circuit connected to the output circuit MRAF (MRAFF flip-flop FIG. 9P). The gate 374 has a control circuit connected to the output circuit of and AND gate 378. The gate 376 has a control circuit connected to the output circuit of an AND gate 380. The AND gating circuits 378 and 380 each have an input circuit connected to the output circuit MROF (MROFF flip-gop FIG. 9P). In addition, the AND gate 378 has an input circuit connected to the output circuit EE4L (E register 54, FIG. 9O) and the AND gating circuit 380 has an additional input circuit connected to the output circuit EE3L (E register 54 FIG. 9O). Whenever control signals are applied to the input circuits of the gates 372, 374, and 376, the word of information stored in the memory information register 348 is stored in the P, A, and B registers 36, 42, and 46, respectively.

The memory information register 348 has an input circuit coupled to the output circuit of the B register 46 through a gating circuit 382. The gating circuit 382 has a control circuit connected to the output circuit of an AND gating circuit 384. The AND gating circuit 384 has its input circuits connected to the output circuits $t0$ (counter 352), E11L, and E17F' (E register 54 FIG. 9O). A control signal applied to the gate 382 causes the word stored in the B register 46 to be stored in the memory information register 348.

*Operation*

Figure 14:
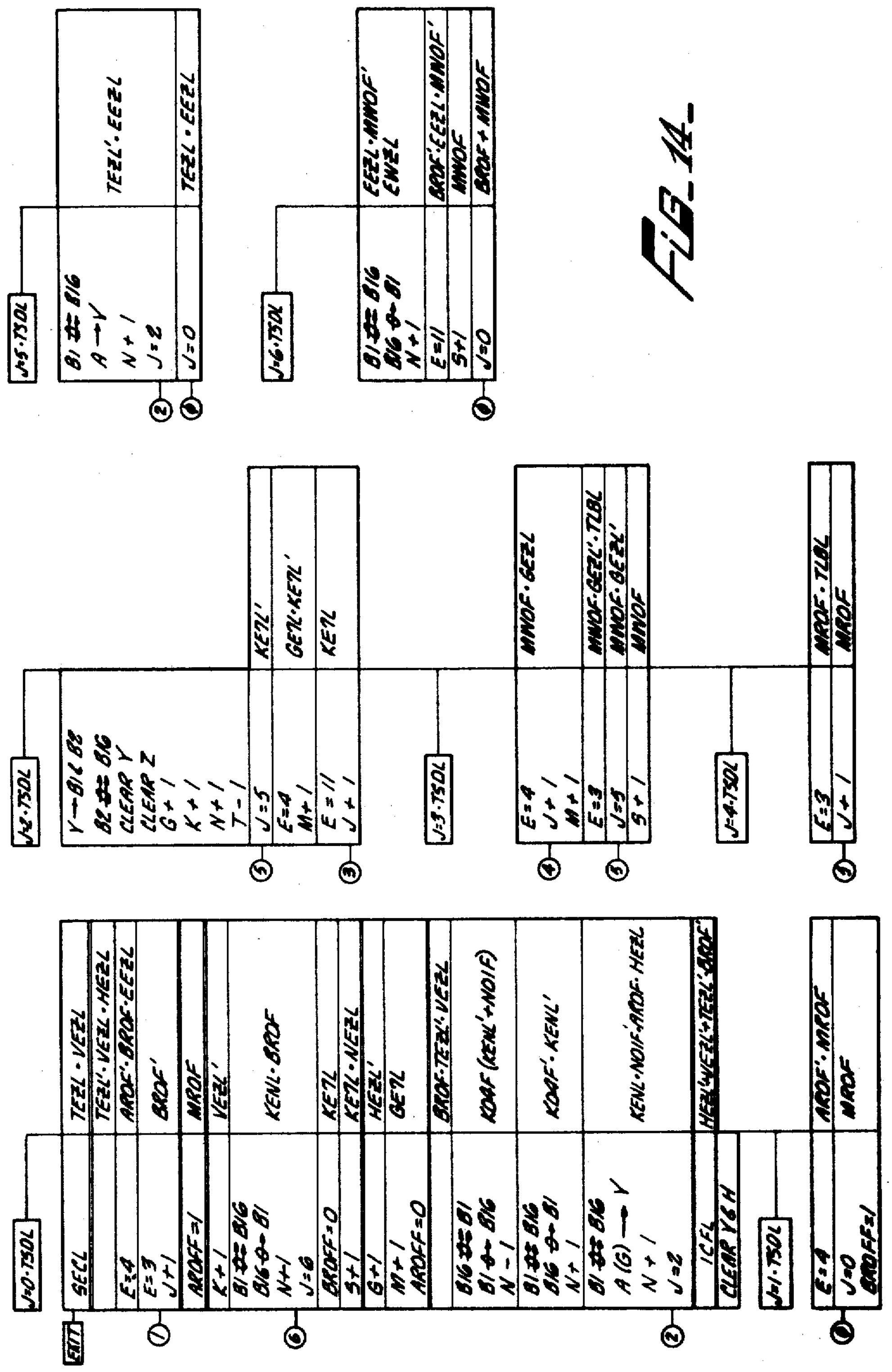
FIG. 14 is a flow diagram illustrating the sequence of steps of operation of the data processor of FIG. 6 while executing a transfer source to destination program syllable.

With the details of the circuits of FIGS. 7, 8, and 9A through 9T in mind, a description of the operation of the data processor 22 and memory 24 will be given. In order to help explain the operation of the data processor 22 and memory 24, the flow diagrams shown in FIGS. 12, 13, and 14 are provided. FIGS. 11, 12, and 13 indicate the sequence of operation of the indicated flip-flops and registers of the processor 22 and the memory 24 during a fetch operation, reverse and forward skip source operations, and a transfer source to destination operation, respectively.

In each of the flow diagrams there are two columns divided into rows. At the right of each row, as viewed in the figures, esential control circuit terms for a particular operation of the data processor are shown in logical equation form. At the left side of each row the type of operation performed is symbolically illustrated. The term in the box at the top of the two columns is an AND term in each of the equations below at the right of each row. Some of the flow diagrams have a double line above a portion of the columns. Whenever a double line is shown, this indicates that the term or equation in the row immediately below the double line must be anded with each of the terms in the rows below until the next double line is reached in the column. The next subsequent double line indicates that the terms in the row immediately below such double lines are again to be anded with the terms in the rows below.

*Fetch operation*

Refer now to the fetch flow and the circuits for implementing the fetch operation. Fetch is used herein to indicate the operation of transferring an operator syllable from the program register, referred to as the P register 36 to the O and T registers 38 and 40, and to refer to the operation of reading a program word out of the memory 24 and storing the word in the P register 36.

During certain operations of the data procesor 22, it is necessary to inhibit a fetch operation. The reason fetch is inhibited is to allow other memory accesses to take precedence. For example, fetch is inhibited to allow a source or a destination word to be read out of the memory and stored in the A and B registers 42 and 46 thereby providing an immediate string of source and destination characters for operation on by the data processor 22. With one or more unedited or unused characters stored in the A and B registers 42 and 46 fetch may be performed concurrently with the execution of one of the operator syllables stored in the P register 36.

An example of a condition wherein fetch is inhibited occurs in the transfer source to destination flow shown in FIG. 14. Whenever an inhibit fetch is to occur a control signal is formed at the ICFL output circuit. FIG. 9S shows the gates 336, 334 and 330 for generating the control signals at the output circuit ICFL during an inhibit fetch.

A timing diagram showing an example of the sequence of operation for a fetch is shown in FIG. 15. Referring now to FIG. 15, assume that the following initial conditions exist:

*Table 1*

L register 34=2
PROFF=1
E16FF=0
E17FF=0
C register 26=625
MRAFF=0
E register 54=0
Counter 352=5

A control signal (yes level) is developed at the SECL output circuit of the OR gate 338 (FIG. 9T) whenever the execution of an operator syllable is completed. Assume initially that with the initial conditions shown above a control signal is developed at the SECL output circuit of the gate 338. At this point the gate 234 (FIG. 9K) develops a control signal at the reset=0 input circuit of the flip-flop PROFF. In addition, the gates 240 and 238 (FIG. 9K) provide a control signal at the P→T, 0 input circuit of the gate 242 (FIG. 7). Thus, the clock pulse signal at the end of the timing period T1 of FIG. 15 causes the PROFF flip-flop to be set into a "0" state and causes the gate 242 to store the operator syllable stored in the syllable storage section 2 of the P register 36 into the O and T registers 38 and 40. The setting of the J register 52 is independent of the fetch operation and will be explained in a subsequent description.

During the time period T2 of FIG. 15 the state of the flip-flops and storage contents of the registers of the data processor 22 are the same as the initial condition listed above except that the PROFF flip-flop is now in a state "0" and a new operator syllable is stored in the O and T registers 38 and 40. During the time period T2 the gate 226 (FIG. 9J) develops a control signal at the $L+1$ control circuit of the L register 34. Also, the gates 232, 230 and 228 (FIG. 9K) apply control signals at the set=1 input circuit of the PROFF flip-flop (FIG. 7). Thus, the clock pulse signal at the end of the timing period T2 causes the L register 34 to be counted from state two into state three and causes the PROFF flip-flop to be retriggered into a "1" state.

In summary, when an end of operator signal, SECL, is generated and the PROFF flip-flop is in a "1" state, the "1" state of the PROFF flip-flop indicates that there is at least one more operator syllable stored in the P register 36 to be executed. Subsequently, the operator syllable specified by the state of the L register 34 is read out of the P register 36 and stored in the O and T registers 38 and 40. Subsequently, the L register 34 is counted up one state so that the state thereof indicates the next operator syllable to be executed.

Assume now that the processor has advanced to the timing period T1′ of FIG. 15 and that the initial conditions listed above are the same except that the L register 34 is now in state three. During the timing period T1′ assume that a control signal is again developed at the SECL output circuit of the gate 338 (FIG. 9T) causing control signals to be developed at the P→T, 0 output circuit of the gating circuit 238 (FIG. 9K) and the reset=0 output circuit of the gate 234 (FIG. 9K). The clock pulse signal at the end of the timing period T1′ causes the PROFF flip-flop to be triggered into a "0" state and the operator syllable stored in the section 3 of the P register 36, as specified by state three of the L register 34, is stored in the O and T registers 38 and 40.

During the timing period T2′ asume that an inhibit fetch signal is not generated at the output circuit ICFL of the gate 330 (FIG. 9S). The gate 226 (FIG. 9J) applies a control signal at the $L+1$ input of the L register 34. Since the L register 34 is now in state three, the gates 230 and 228 (FIG. 9K) do not generate a control signal at the set=1 input circuit of the PROFF flip-flop causing it to remain in a "0" state. However, since the L register 34 is now in state three, the gates 288 and 286 (FIG. 9Q) now develop a control signal at the $C+1$ input circuit of the C register 26 and the set=1 input circuit of the E16FF flip-flop. Thus, the clock pulse signal at the end of the timing period T2′ of FIG. 14 causes the L register 34 to count from state three back to state zero, the E16FF flip-flop to be set into a "1" state and the C register 26 to count into state 626.

Thus, at this point the C register 26 is in a state corresponding to the address of the next program word to be read out of the memory 24, word 626, and the L register 34 is in state zero, thereby indicating the position from which the next operator syllable is to be read out of the P register 36 for storage in the O and T registers 38 and 40.

During the time period T3' assume that no other memory access is taking place. If no other memory accesses are taking place, the register 56 portion of the E register 54 is in a zero state causing a control signal at the EEZL output circuit thereof. Also, assume that the MWOFF flip-flop is in a state "0". The E16FF flip-flop is now in a "1" state. Therefore, the gate 290 (FIG. 9Q) develops a control signal at the set=1 input circuit of the E17FF flip-flop. Thus, the clock pulse signal at the end of the timing period T3' causes the E17FF flip-flop to be triggered into a "1" state. The flip-flop E17FF in a "1" state indicates that a fetch from memory 24 is in progress. Referring now to FIG. 8, during the timing period T4' the E17FF flip-flop is in a "1" state causing a control signal to be applied to the input of the OR gate 356. The clock pulse signal at the end of the timing period T4' causes the counter 352 to count from state five to state zero.

During the timing period T5' of FIG. 15 the counter 352 is in state zero. This causes the gate 364 (FIG. 8) to apply a control signal to gate 358 and cause the address stored in the C register 26 to be stored in the memory address register 350. Other than the memory address register 350, during the timing periods T5' and T6' and T7' the content of the registers and the state of the flip-flops remain the same except for the counter 352 which counts through states zero, one and two. During states zero, one and two of the counter 352 the memory location specified by the address stored in the memory address register 350 is read out of the magnetic core memory unit 346 and stored in the memory information register 348. At the end of the timing period T7' the counter 352 is in state two, and the E17FF flip-flop is still in state "1." Thus, the gate 254 (FIG. 9P) applies a control signal at the set=1 input circuit of the MRAFF flip-flop, and the clock pulse signal at the end of the timing period T7' causes the MRAFF flip-flop to be triggered into a "1" state. During timing period T8' the counter 352 is in state three, the reset=0 input circuits of the E17FF and E16FF flip-flops receive a control signal and the gate 372 (FIG. 8) receives a control signal. The clock pulse signal at the end of the timing period T8' causes the program word stored in the memory information register 348 to be read out through the gate 372 and stored in the P register 36, the PROFF flip-flop to be triggered into a "1" state and the flip-flops E16FF, E17FF and MRAFF to be retriggered into state "0."

Assume that during T1' of the fetch timing diagram of FIG. 14 that an inhibit fetch signal is developed at the ICFL output circuit of the gate 330 (FIG. 9S). Such a control signal indicates that another memory access is to take place, for example, a destination word is being read from the memory 24. The inhibit fetch control signal indicates that the fetch operation must be delayed until the previous memory cycle is completed. If such other memory access is taking place, the register 56 portion of the E register 54 is not in a zero state and a control signal is not applied at the control line EEZL. Thus, the gate 364 does not apply a control signal to the gate 358 (FIG. 8) and the address is not read out of the C register 26 for storage in the memory address register 350. When the memory access is subsequently completed, the inhibit fetch signal is terminated and a signal is again developed at the ICFL' output circuit of the inverter circuit 132 (FIG. 9S). The C register 26 is then incremented and the E16FF flip-flop is set into a "1" state indicating that the fetch operation may now take place.

*Transfer source to destination operator operation*

Having the fetch operation in mind refer now to the operation of the data processor 22 wherein a transfer source to destination operator is executed. As pointed out hereinabove, a transfer source to destination operator syllable causes characters to be transferred from the source string stored in the A register 42, to the destination string, stored in the B register 46. The transfer source to destination operator syllables have two characters, one of which is the operator which designates that the syllable is a transfer source to destination syllable. The other character is a repeat character or field which designates the number of characters to be transferred from the source string to the destination string. The transfer operator is transferred from the P register 36 to the O register 38, whereas the repeat field is transferred from the P register 36 to the T register 40. The operation of the data processor 22 during execution of the transfer source to destination operator syllable may best be analyzed with reference to the flow diagram shown in FIG. 14 which shows the gate conditions and the corresponding operation performed by the flip-flops and registers. First assume a transfer source to destination operator is stored in the O register 38 and assume the following entry conditions;

H register 44=0
V register 20=0
T register 40=0

Since the content of the T register 40 is zero, this indicates that no characters are to be transferred from the A to the B register. Initially the J register 58 is set into a zero state and the gates 82, 86 and 84 (FIG. 9M) generate control signals at the HEZL, VEZL and TEZL output circuits thereof. The signal at TEZL indicates that no characters are to be transferred between the A and B register 42 and 46. The signal at VEZL indicates the bit pointers (V register 20 and H register 14) are pointing at the first bit of the character specified by the state of the G register 12. Thus the next syllable specified by the state of the L register 34 is transferred from the P register 36 into the O and T registers 38 and 40 and the L register 34 is counted up one state as described hereinabove. If the L register 34 is in a state three prior to the counting thereof the C register 26 will be incremented one unit and a load P register 36 operation carried out as described herein above. Also, control signal is developed at the SECL output of the gate 338 (FIG. 9T) indicating that a new operator is now to be executed.

Assume a transfer source to destination operator is stored in the O register 38 and assume a sequence of operation is now entered wherein the entry into the operation is made under the following conditions:

H register 14≠0
V register 20≠0
T register 40=0
B register 46 is empty
BROFF="0"

Initially the J register is in state zero. Since the V register 20 is not in state zero the gate 86 (FIG. 9M) generates a control signal at the VEZL' output circuit thereof. Also the H register 14 is not in state zero, therefore the gate 82 (FIG. 9M) generates the control signal at the HEZL' output circuit thereof. Thus the first clock pulse signal causes the H and V registers 14 and 20 to be set into a zero state and the K register 18 and the G register 12 are counted up one state as described hereinabove. These operations take place when the B register 46 is empty as indicated by BROFF in state "0." If the B register 46 is not empty and the BROFF flip-flop is in state "1" upon entry to this sequence of operation and if the K register 18 was in state zero prior to the clock pulse the BROFF flip-flop would be set to state "0."

If the K register 18 is in state seven the word address stored in the S register 16 will be incremented one unit. Also if the G register 18, prior to the first clock pulse, is in state seven the source address stored in the M register 10 will be increased one unit and the AROFF flip-flop set to state "0."

The J register 52 remains in state zero during the second clock pulse. During the second clock pulse the V register 20 and the H register 14 are both in state zero therefore the gates 86 and 82 (FIG. 9M) generate control signals at the VEZL and HEZL output circuits thereof and the same conditions exist as described for the first entry conditions causing a new operator syllable to be read out of P register 36 and stored in the O and T registers 38 and 40.

Assume now that another operator syllable has been transferred from the P register 36 to the O and T registers 38 and 40. Assume that a transfer source to destination operator is again stored in the O register 38 and assume that the execution of the operator syllable is now started under the following entry conditions:

H register 14≠0
V register 20≠0
T register 40≠0
B register 46 is full
BROFF="1"
K register 18=N register 80

Initially the J register 52 is in state zero since the H and V registers 14 and 20 are not in state zero, therefore, the gates 86 and 82 (FIG. 9M) generate control signals at the VEZL′ and HEZL′ output circuits thereof. Therefore during the first clock pulse the V register 20 and the H register 14 are set to state zero and the K register 18 is counted up one state. The state of the BROFF flip-flop and the existing condition wherein the K register 18 is equal to the state of the N register 80 (in the three most significant flip-flops of the N register 80) indicate that the B register 46 is aligned and therefore the B register 46 is shifted one-half character to the left when the K register 18 was incremented. Conditions may exist wherein the execution of operators not discussed herein leave the B register 46 not aligned. This is when alignment becomes necessary. Also, the N register 80 is counted one state to record the half character shift of the B register 46.

The B register 46 was only shifted a one-half character, therefore, the B register 46 must be shifted again to make a complete character shift. To accomplish this the second shift is performed while the J register 52 is in state six. Thus the J register 52 is set into state six. At the time the B register 46 was shifted one-half character to the left, the gate 76 (FIG. 9M) was interrogated to see if the KE7L output circuit thereof were receiving a control signal. If a control signal is developed at the KE7L output circuit of the gate 76 the last character of the destination word stored in the B register 46 would have been handled or operated upon and the BROFF flip-flop must be set to state "0" indicating the B register 46 now contains a complete word of edited destination information to be stored in the memory 24 and a new destination word must be read out for storage in the B register 46.

If the H register 14 is not in state zero, the G register 12 is incremented one unit. If the G register 12 is in state seven prior to being incremented, the M register 10 is incremented one unit and the AROFF flip-flop set to state "0" providing a new address in the M register 10 designating the address from which a new source word must be read from the memory 24 for storage in the A register 42.

Also the H register 14 and the V register 20 are reset to state zero while the J register 52 is in state zero.

After the J register 52 is set into state six, the second half character shift of the word in the B register 46 takes place and the N register 80 is counted up one unit to indicate the second half character shift of the B register 46. At this point the state of the K register 18 is equal to that of the three most significant flip-flops of the N register 80. If the BROFF flip-flop is in a state "0" it indicates that the B register 46 contains a destination word which is completely edited ready for storage in the M register 24 and the register 56 portion of the E register 54 is set into state eleven for causing the destination word to be written in memory.

FIG. 10 shows a table of the states of the register 56 along with the state of the E16FF flip-flop and the corresponding memory accesses which take place depending on their states.

After the destination word stored in the B register 46 is stored in the memory 24 a signal is developed at the output circuit MWOF, or in the event that the destination word did not need to be stored the BROFF flip-flop is in a "1" state and the J register 52 is reset to state zero. If a destination word is written in memory 24 the S register 16 is incremented one unit when a signal is developed at the MWOF output circuit indicating the memory access is completed as already described hereinabove. After the destination word is written in the memory 24 the next destination word is read out of the memory 24 from the address designated by the state of the S register 16 all as described hereinabove.

After the J register 52 is reset to state zero the gates 86, 82 and 84 (FIG. 9M) develop control signals at the VEZL, TEZL′ and HEZL output circuits thereof. This causes the states of the A and B register occupancy flip-flops AROFF and BROFF to be interrogated. If the BROFF flip-flop is in a "1" state the AROFF flip-flop is in a "0" state the A register 42 must be loaded. Under such a condition the register 56 portion of the E register 54 is set into state four causing a control signal at the EE4L output circuit thereof. However, if the BROFF flip-flop is in a "0" state the register 56 section of the E register 54 is unconditionally set into state three causing a signal at the EE3L output circuit thereof and the J register is counted into state one causing the B register 46 to be loaded first regardless of whether the AROFF flip-flop is in a "0" state (indicating that the A register 42 must be loaded).

With the J register 52 in state one and a load B register 46 memory access is in progress, the data processor 22 waits until the MROFF flip-flop is triggered into a "1" state. When the MROFF flip-flop is triggered into a "1" state it indicates that the memory access is complete and the contents of the B register 46 is completely stored in the memory 24. When the MROFF flip-flop is in a "1" state and the AROFF flip-flop in a "0" state, the register 56 section of the E register 54 is triggered into state four causing a signal at the EE4L output circuit thereof. Also, when the MROFF flip-flop is triggered into a "1" state the BROFF flip-flop and the J register 52 are triggered into states "0" and "1" respectively. With the register 56 section of the E register 54 in state four a source word is read out of the memory 24 and stored in the A register 42.

With the J register 52 back in state zero, the BROFF flip-flop is in state "1" and the gates 86, 82 and 84 (FIG. 9M) generate control signals at the VEZL, HEZL and TEZL′ output circuits thereof allowing the B register 46 to be aligned if necessary. If the state of the K register 18 is equal to the state of the three most significant digits of the N register 80 the B register 46 is shifted one-half character to the left. Also, the character of the A register 42 specified by the state of the G register 12, is read out of the A register 42 and stored in the Y register 44. The N register 80 is counted up one unit to denote the half character shift of the B register 46 and the J register 52 is set into state two.

Beginning with state two of the J register 52 the transfer of characters from the A register 42 to the B register 46 is commenced. Thus the characters previously read out of the A register 42 for storage in the Y register 44 are transferred and stored into the sections B1 and B2 (input alignment station) of the B register 46. Simultaneously a one-half character shift to the left occurs in each of the sections B2 through B16 of the B register 46. Also the character pointers (G register 12 and K register 18) are advanced one unit thereby pointing at the next character to be read out of the A and B register 42 and 46.

While the J register 52 is in state two the state of the K register 18 is noted. If the K register 18 is in state seven it indicates that the last character position of the destination word read out of the memory 24 and stored in the B register 46 has been operated upon and the destination word must be written in the memory 24. The writing of the destination word in the memory 24 takes precedence over the reading out of a new source word for storage in the A register 42. Thus, if the G register 12 is in state seven and the K register 18 is not in state seven then the M register 10 is counted up one unit and the A register 42 is reloaded. Also, the J register 52 is set into state five wherein a new character is read out of the A register 42 for storage in the Y register 44. However, if the K register 18 were in state seven the J register 52 is counted into state three regardless of the state of the G register 12. Also, the N register 80 is counted up one unit to designate the half charcater shift of the destination word stored in the B register 46.

Assuming the K register 18 was in state seven when the J register 52 was in state two, the destination word stored in the B register 46 is written in the memory 24 and when complete the MWOFF flip-flop is triggered into a "1" state. When the MWOFF flip-flop is triggered into a "1" state and if the G register 12 is in a zero state, indicating the last character of the A register 42 has been operated upon a new source word is read out of the memory 24 and stored in the A register 42. If, however, the G register 12 is not in state zero and the T register 40 is in a state less than state eight the gate 84 (FIG. 9M) generates a control signal at the TL8L output circuit thereof and the register 56 portion of the E register 54 is set into state three causing a memory access to be initiated wherein a new destination word is read out of the memory 24 and stored in the B register 46. Also the state of the S register 16 is counted up one unit.

If a new source word is read out of the memory 24 and stored in the A register 42 the J register 52 is counted into state four allowing the source word to be read out of the memory 24 and stored in the A register 42 prior to the reading out of the new destination word.

When the J register 52 is in state four (occurring if a new source word is read out of the memory 24 for storage in the A register 42) and the MROFF flip-flop is set into a "1" state, indicating the previous memory access is complete, the register 56 portion of the E register 54 is set into state three, a destination word is loaded into the B register 46. Also, when the MROFF flip-flop is set into a "1" state the J register 52 is counted into state five.

It should be noted at this point that the TL8L output circuit of the gate 84 (FIG. 9M), is a term in each of the gates controlling the reading out of a new destination word from the memory 24 for storage in the B register 46. Thus a new destination word is read out of the memory 24 and stored in the B register 46 during the time the J register is in state three and four only when the T register 40 is in a state less than state eight. If the T register 40 is in a state greater or equal to state eight this indicates that at least one complete source word is to be transferred into the destination string of information. Therefore it is unnecessary to read out a new destination word since each of the positions will be filled by a new source character.

Assume now that the J register 52 is in state five. The character stored in the A register 42 specified by the state of the G register 12 is stored into the Y register 44. However, the character is stored in the Y register 44 only if the state of the T register 40 is not zero and the register 56 section of the E register 54 is in state zero. If the T register 40 is in state zero it indicates that the last character has been shifted out of the A register 42 which is to be transferred. If the register 56 section of the E register 54 is not in state zero it indicates that a memory access is taking place and the reading of a character from the A register 42 for storage in the Y register must be delayed until the access is complete. This is necessary in that the memory access taking place may be that of reading a new source word for storage in the A register 42. Simultaneously with the shifting of a character from the A register 42 to the Y register 44 the B register 46 is shifted one-half character to the left and the N register 80 counted up one unit to record the half character shift. Also simultaneously with the shifting of a character from the A register 42 to the Y register 44 the J register 52 is set back into state two. If the T register 40 is in state zero this indicates the execution of the operator syllable is complete and the J register 52 is reset into state zero.

When the J register 52 is reset into state two it indicates that a character is stored in the Y register 44 for storage in the B register 46. Thus the second half character shift is made by the B register 46 and the character stored in the Y register 44 is stored in the B1 and B2 sections of the B register 46.

An example of the timing for executing a transfer source to destination operator is shown in FIG. 16B which shows the sequence of operation of the designated flip-flops and registers of the data processor 22 and may be understood with reference to the preceding description.

FORWARD AND REVERSE SKIP SOURCE

*Operator operation*

Refer now to the operation of the digital data processor 22 wherein the forward and reverse skip operators are executed. The general purpose of the operators are to cause the data processor 22 to skip forward and backward over a number of characters in the source string of information. The number of characters skipped is determined by the repeat count field which is stored in the T register 40 and whether a forward or a reverse skip is to be performed is indicated by the operator field stored in the O register 38. The number of characters skipped in the source string may vary from 0 through 63 characters.

Basically the purpose of the skip operators is to reset or re-adjust the source word pointer (M register 10) and the source character pointer (G register 12) in order to indicate the next word and character to be operated upon after the skip and to mark the A register 42 empty if the skip operator specifies that all source characters in the A register 42 are to be skipped. Setting the AROFF flip-flop to a "0" state marks the A register 42 empty.

The execution of a forward skip source operator is commenced by adjusting the bit pointers (V register 20 and H register 14) to zero. If the repeat field (stored in T register 40) of the operator is not zero and is less than eight the source character pointer (G register 12) is increased one unit and the repeat field (stored in T register 40) decreased one unit. The increasing of the source character pointer and the decreasing of the magnitude of the repeat field is continued until the repeat field is zero.

If a forward skip operator (stored in O register 38) is to be executed and the repeat field (stored in T register 40) is greater than eight the magnitude of the repeat field is decreased by eight and the address of the source word pointer (M register 10) increased one unit. This is repeated until the magnitude of the repeat field is less than eight. Once the repeat field is less than eight the repeat field is repeatedly decreased one unit and the source character pointer (G register 12) repeatedly increased one unit (with the decrease of the repeat field) until the repeat field is zero. When the repeat field is reduced to zero the proper number of characters of the source string have been skipped and the next operator syllable stored in the P register 36 is executed.

Thus during the execution of a forward skip source operator syllable the source character pointer (G register 12) is adjusted skipping over the correct number of characters in the source string of information. Also if necessary the source word pointer (M register 10) is adjusted to skip the correct number of words in the source string of information.

The execution of a reverse skip source operator is similar to that of the forward skip source operator except that the source character pointer (G register 12) and the source word pointer (M register 10) are decreased rather than increased in order to skip the source character in a reverse direction.

Although forward and reverse skip source operators are explained by way of example herein characters in the destination string of information may be skipped in a similar manner.

Refer now to the detailed operation of the data processor 22 wherein forward and reverse skip source operators are executed. The following description is made with reference to the forward and reverse skip operator flow shown in FIG. 13. Initially upon entering the execution a skip operator the H register 14 and the V register 20 are unconditionally reset to zero. If the H register 14 is not in state zero it indicates that the G register 12 is in a state or points at a character in the source string (stored in the A register 42) which has already been operated upon. If the H register 14 is not in state zero and a forward skip source operator syllable is being executed the state of the G register is increased one unit. If a reverse skip source operator syllable is being executed and the T register 40 is in state zero the G register 12 is increased one unit thereby pointing at the next character in the source string stored in the A register 42 to be operated upon.

This allows the skip operation to begin at the beginning of the next character in the source string.

For example if a forward skip source operator is being executed the next sequential character in the source string is to be operated upon and must be designated by the character pointer (G register 12). If a reverse skip source operator is being executed and the repeat field (stored in T register 40) is zero it indicates that no characters are to be skipped and the character pointer (G register 12) must be adjusted to point at the next character for execution of a subsequent operator syllable.

The state of the M register 10 is increased one unit and the AROFF flip-flop retriggered into a "0" state, indicating the A register 42 is empty, if the last character of the source word stored A register 42 is skipped (G register 12 is in state seven) and the other conditions given above for counting the G register 12 up one exist. This causes the M register 10 to point at the next word in the source string stored in the memory 24 to be skipped or operated upon by the next operator syllable.

The state of the T register 40 (therefore the repeat field) is decreased by one unit when a reverse skip source operator is being executed and the T and V registers 40 and 20 are not in state zero. Such a condition is indicated by control signals at the output circuits RSSL, TEZL' and HEZL' of the gates 86, 84 and 82 (FIG. 9M). The T register 40 (therefore the repeat field) is counted down one unit under these conditions rather than increasing the G register 12 by one unit and then having to decrease it by one unit for the first skip of the reverse skip operation.

If the T register 40 (therefore the repeat field) is zero initially, this essentially is a no-operation condition, and the execution of the skip operator is terminated immediately by generating a control signal at the SECL output circuit of the gate 338 (FIG. 9T). Whenever the state of the T register 40, during normal operation, is counted down to zero, this indicates that the execution of the operator is complete and a control signal is also developed at the SECL output circuit of the gate 338 (FIG. 9P) indicating the operator syllable is to be terminated.

After the H register 14 has been set to state zero and if the T register 40 is not in state zero, the operation of the data processor 22 depends on the condition of other registers and flip-flops of the data processor. For example, if either a forward or a reverse skip operator is being executed and the T register 40 is in a state less than eight, a control signal is developed at the TL8L output circuit of the gate 84 (FIG. 9M) and the state of the T register 40 is decreased by one unit. If, however, the T register 40 is in a state greater than eight, a control signal is developed at the TL8L' output circuit of the gate 84 (FIG. 9M) and the state of the T register 40 is decreased by eight units. By decreasing the state of the T register 40 by eight, the skipping operation is speeded up in that a complete word is skipped rather than skipping a character at a time. This is permissible in that when the T register 40 is in a state greater than eight, it indicates that a complete word is to be skipped.

When the H register 14 is in state zero, forward skip operator is being executed, and the state of the T register 40 is less than eight, control signals are developed at the TEZL', TL8L, HEZL and FSSL output circuits of the gates 84, 82 and 88 (FIG. 9M) causing the state of the G register 12 to be increased one unit each time the T register 40 is decreased one unit. If, however, a reverse skip source operator is being executed rather than a forward skip source operator, a control signal is developed at the RSSL output circuit of the gate 88 and the state of the G register 12 is decreased one unit with each decrease in the state of the T register 40.

When the H register 14 is in state zero, the T register 40 is not in state zero, the state of the M register 10 will be increased one unit if the G register 12 is at its maximum state (state seven) or the T register 40 is in a state greater than eight. Such states of the G register 12 and the T register 40 cause control signals at the GE7L, TEZL' and TL8L' output circuits of the gates 74 and 84 (FIG. 9M). Thus, the M register 10 is increased one unit to indicate a complete word skip whenever eight characters (one word) is to be skipped or the G register 12 is counted from state seven into state zero (indicating an overflow from the end of one word to the beginning of the next word in the source string of information).

If the H register 14 is in state zero and the T register 40 is not in state zero, a reverse skip source operator is being executed and either the G register 12 is in state zero or the state of the T register 40 is greater than eight, the state of the M register 10 is decreased by one unit which either cancels a skip in a reverse direction of eight characters (one word) of the source string or a skip (or overflow) from one word to the previous word in a reverse direction.

When executing a reverse skip source operator and the G register 12 is in state zero, the operator will cause the data processor 22 to skip back to a word stored in memory 24. Thus, the information in the A register 42 is in effect lost and the AROFF flip-flop must be set to a "0" state to indicate that the A register 42 is empty and will need new source characters in executing a subsequent operator syllable. Also, if a forward skip source operator is being executed and the G register 12 is in state seven, a skip is going to occur into a word of the source string of information stored in the memory 24. Again the word of information stored in the A register 42 is of no use at this point in the operation and the AROFF flip-flop is reset into a "0" state. When the state of the T register 40 is greater than eight, the state of the M register 10 is to be increased or decreased, thereby skipping at least eight characters (one word) in the source string of information. In this situation again the source word stored in the A register 42 is of no use in editing during the execution of a subsequent operator syllable and the AROFF flip-flop is retriggered into a "0" state indicating the A register 42 is empty.

An example of the timing for executing a skip forward operator syllable is shown in FIG. 17 and may be understood with reference to the preceding description.

It should be understood that electronic circuits for executing many other operator syllables may be devised within the scope of the present invention. For example add operator syllables may be executed wherein the number of characters of the source string to be added to the destination string is specified by the repeat field. Similarly a compare operator may be executed by circuits within the scope of the present invention using the repeat field of the operator syllable to designate the number of characters of the source and destination string to be executed. Similarly, test operator syllables may be executed wherein bits of the characters of the source and destination string are tested for certain binary states.

What is claimed is:

1. An editing unit for a data processor for editing characters of information comprising: addressable memory means for storing information represented by a source string of character signals and a destination string of character signals and for storing a program string of syllable signals, each syllable identifying a complete editing operation and the number of source and destination string characters to be operated upon, the characters and syllables being arranged in words, said memory means including sequentially addressable memory locations for storing said words; means connected to said memory for sequentially reading information out of said memory a word at a time; register means responsively connected for individually storing a source word, a destination word, and a program word read out of said memory means; means for sequentially executing the program syllables on the number of characters of the source and destination words stored in said register means as is specified by each program syllable of the program word stored in said register means and for causing modified and edited destination words to be stored in the register means, said reading means including a source read means connected for selectively reading out the next sequentially addressable source word after a program operation has been initiated upon each character of the source word stored in said register means, destination read means connected for selectively reading out the next sequentially addressable destination word after a program operation has been initiated upon each character of the stored destination word, and program read means connected for selectively reading out the next sequentially addressable program word after the execution of each of the syllables of a stored program word has been initiated; and means connected for selectively writing a stored destination word as edited back into said memory means after initiating program operations upon each character thereof.

2. An editing unit for a data processor for editing characters of information comprising: addressable memory means for storing information represented by a source string of character signals and a destination string of character signals and for storing a program string of syllable signals, each syllable identifying a complete editing operation and the number of source and destination string characters to be operated upon, the characters and syllables being arranged in words, said memory means including sequentially addressable memory locations for storing said words; means connected for sequentially reading information out of said memory a word at a time; separate register means connected for storing at least one complete source word, one complete destination word, and one complete program word read out of said memory means; syllable counting means associated with the program register means and connected for providing an indication of the next program syllable in the program word stored in such register means to be executed; separate character counting means associated with each of the source and destination register means and connected for providing an indication of the next character in the source and destination words stored in such register means to be operated upon; means connected to be responsive to said syllable and character counting means for sequentially executing the program syllable of said stored program word which is designated by said program syllable counter on the number of characters of the said stored source and destination words is specified by the program syllable being executed and for causing a modified and edited destination word to be stored in said destination register means, said reading means comprising source read means connected to be responsive to said source counting means for reading out the next sequentially addressable source word after a program operation is initiated upon each character of the read-out source word, destination read means connected to be responsive to said destination counting means for reading out the next sequentially addressable destination word after a program operation is initiated upon each character of the read-out destination word, and program read means connected to be responsive to said syllable counting means for reading out the next sequentially addressable program word after the execution of each of the syllables of a read-out program word is initiated; and means connected to be responsive to the destination character counting means for selectively writing a read-out destination word in said memory means upon completing program operations upon each character thereof.

3. An editing unit for a data processor for editing characters of information comprising: addressable memory means for storing information represented by a source string of character signals and a destination string of character signals and for storing a program string of syllable signals, each syllable identifying a complete editing operation and the number of source and destination string characters to be operated upon, the characters and syllables being arranged in words, said memory means including sequentially addressable memory locations for storing said words; means connected for sequentially reading information out of said memory a word at a time; separate memory addressing means for each of the source, destination, and program strings of information for providing separate electrical signals indicative of the addresses of the next source, destination and program words to be read out of said memory; separate register means connected for storing a complete source word, a complete destination word, and a complete program word read out of said memory means; syllable counting means associated with the program register means and connected for providing an electrical signal indicative of the next program syllable in the read-out program word to be executed; separate counting means associated with each of the source and destination register means and connected for providing electrical signals indicative of the next character in the read-out source and destination words to be operated upon; means connected to be responsive to the electrical signal of said syllable, source and destination counting means for sequentially executing the program syllables of the read-out program word on the number of characters of the read-out source and destination words as specified by the program syllable being executed and thereby cause a modified and edited destination to be stored in said destination register means, said reading means comprising source read means connected to be responsive to the electrical signals of the source character counting means and the source addressing means for reading out the next sequentially addressable source word after a program operation is initiated upon each character of the read-out source word, destination read means connected to be responsive to the electrical signals of the destination character counting means and the destination addressing means for reading out the next sequentially addressable destination word after a program operation is initiated upon each character of the read-out destination word; and program read means connected to be responsive to the electrical signals of the program syllable counting means and the program addressing means for selectively reading out the next sequentially addressable program word after the execution of each of the syllables of a read-out program word is initiated; and means connected to be responsive to the electrical signals of the destination character counting means and the destination addressing means for selectively writing a read-out destination word in said memory means after completing program operations upon each character thereof.

4. An editing unit for a data processor as defined in claim 3 wherein the program syllables include at least one syllable specifying that characters are to be transferred from the source string of information to the destination string of information, and wherein said executing means comprises means coupled for transferring the number of characters from said source register means to said destination register means as specified by a transfer program syllable indicated by said syllable counting means.

5. An editing unit for a data processor as defined in claim 3 wherein the program syllables include at least one syllable specifying that characters in the source string of information are to be skipped, and means connected for selectively altering the electrical signals of said source memory addressing means and the electrical signals of said source counting means thereby skipping the number of characters in the source string specified by the skip program syllable to provide an indication of the next word and character of the word to be operated upon following the skip.

6. An editing unit for a digital data processor for editing characters of information comprising: addressable memory means for storing information represented by a source string of character signals and a destination string of character signals and for storing a program string of syllables, each syllable having an operation character signal identifying a complete editing operation and a repeat character signal identifying the number of source and destination string characters to be operated upon, the characters and syllables being arranged in sequence in words of fixed length, said memory means including sequentially addressable memory locations for storing said words; means connected for reading information out of said memory means a word at a time; register means connected for individually storing at least one complete source word, one complete destination word, and one complete program word read-out of said memory means; means connected for executing the syllables of the read-out program word, one by one, and thereby operate on the source and destination characters, one by one, in a sequence as specified by the operation characters of the program syllables for causing a modified and edited destination word to be stored in said register means; means connected for selectively modifying the magnitude of the repeat character of the syllable being executed as the source and destination characters are operated upon and for generating an electrical signal identifying the last character to be operated upon by the program syllable, said executing means further being connected to be responsive to the last character identifying electrical signal for commencing the execution of the next sequential program syllable in the read-out word, said reading means comprising source read means connected for reading the next sequentially addressable source word out of said memory means after the execution of a program operation upon each character of the read-out source word is initiated, destination read means connected for reading the next sequentially addressable destination word out of said memory means after the execution of a program operation upon each character of the read-out destination word is initiated, and program read means connected for reading out the next sequentially addressable program word after the execution of each of the syllables of the read-out program word is initiated; and means connected for selectively writing a read-out destination word in said memory means after completing program operations upon each character thereof.

7. In a digital data processor comprising, memory means for storing words of information including a series of program words each comprising a plurality of program instruction syllables, address counting means adapted for selectively counting through a sequence of addresses corresponding to said program words, means for reading out the information content of said memory means including means for reading out said program words, one by one, designated by said address counting means, register means for storing a complete program word read out of said memory means, syllable counting means adapted for selectively and sequentially counting through a sequence of steps designating the program instruction syllables, one by one, from a first syllable to a last syllable, stored in said register means, and means including processing means adapted for executing the program instruction syllable designated by each of said steps of said syllable counting means on the information read out of said memory means.

8. In a programmable digital computer comprising, memory means for storing information including a series of program words, each word comprising a plurality of program instruction syllables, means for reading out the information content of said memory means including means for reading out said program words, one by one, register means for storing a complete program word read out of said memory means, syllable counting means adapted for selectively and sequentially counting through a sequence of steps designating the program instruction syllables, one by one, stored in said register means, and means coupled to said syllable counting means including processing means adapted for executing the program instruction syllable designated by each of said steps of said syllable counting means on the information read out of said memory means.

9. In a digital data processor comprising, memory means for storing words of information including a series of program words each comprising a plurality of program instruction syllables, register means for storing a complete program word read out of said memory means, syllable counting means adapted for selectively and sequentially counting through a sequence of steps designating the program instruction syllables which are stored in said register means, one by one, from a first syllable to a last syllable, means including processing means adapted for executing the program instruction syllable designated by each of said steps of said syllable counting means on the other information stored in said memory means, and means for reading out the series of program words from said memory means for storage in said register means, said read means being adapted for selectively reading out a new program word concurrently with the designation of the last syllable by said syllable counting means independently of the program instruction syllables to thereby maintain a supply of program syllables in said register means for execution, said read means including program word counting means for selectively counting through a sequence of steps designating the addresses of said series of program words to be read out.

10. In a digital data processor comprising, memory means for storing data words and a series of program words each comprising a plurality of instruction syllables, address counting means for selectively counting through a sequence of addresses corresponding to said program words, means for reading information from said memory means, word by word, including means for reading said data words and including means for reading the program words designated by said address counting means, first and second register means for storing two data words which are read from said memory means, third register means for storing a complete program word read out of said memory means, syllable counting means for selectively and sequentially counting through a sequence of steps designating the program instruction syllables stored in said third register means, one by one, from a first syllable to a last syllable, and means including processing means adapted for executing the program instruction syllable designated by each of said steps of said syllable counting means on the content of said first and second register means.

11. In a digital data processor comprising, memory means for storing first and second strings of characters of information and a series of program syllables, each of said syllables having a first part designating an editing operation on said strings of characters and a second part designating the number of said characters to be operated upon, means for selectively reading said first and second strings of characters and said program syllables out of said memory a fixed group at a time, means including first, second and third register means for storing the first character group, the second character group and a complete program syllable group, respectively, as they are read out of said memory means, means adapted for executing the syllables stored in said first register means, one by one, in a predetermined order on the first and second strings of characters stored in said first and second register means, and means including counting means adapted for selectively counting through a sequence of steps corresponding to the number of characters indicated by the second part of a program syllable being executed, said executing means being adapted in cooperation with said counting means for performing the editing operation designated by the first part of a syllable being executed at least once for each of said counts corresponding to the second part of the same syllable.

12. In a digital data processor comprising, memory means for storing first and second strings of characters of information and a series of program syllables, each of said syllables having a first part designating an editing operation on said strings of characters and a second part designating the number of said characters to be operated upon, means for selectively reading said first and second strings of characters and said program syllables out of said memory a fixed group at a time, means including first, second and third register means for storing the first character group, the second character group and a complete program syllable group, respectively, as they are read out of said memory means, means adapted for executing the syllables stored in said first register means, one by one, in a predetermined order on the first and second strings of characters stored in said first and second register means, counting means adapted for providing an indication to said executing means of the next program syllable stored in said third register means to be executed, the executing means being adapted for executing said program syllables in the indicated order and means including counting means adapted for selectively counting through a sequence of steps corresponding to the number of characters indicated by the second part of a program syllable being executed, said executing means being adapted in cooperation with said counting means for performing the editing operation designated by the first part of a syllable being executed at least once for each of said counts corresponding to the second part of the same syllable.

13. In a digital data processor comprising, memory means for storing first and second strings of characters of information and a series of program syllables, each of said syllables having a first part designating an editing operation on said strings of characters and a second part designating the number of said characters to be operated upon, said syllables including a transfer syllable wherein said first part designates a transfer of characters from said first string to said second string of characters, means for selectively reading said first and second strings of characters and said program syllables out of said memory a fixed group at a time, means including first, second and third register means for storing the first character group, the second character group and a complete program syllable group, respectively, as they are read out of said memory means, means adapted for executing the syllables stored in said first register means, one by one, in a predetermined order on the first and second strings of characters stored in said first and second register means and including means responsive to said transfer syllable for transferring a character from said first register means to said second register means, and means including counting means adapted for selectively counting through a sequence of steps corresponding to the number of characters indicated by the second part of such transfer syllable, said transfer means being adapted in cooperation with said counting means for transferring a character from said first register to said second register for each of said counts corresponding to the second part of such transfer syllable and thereby cause a transfer of the number of characters from said first register means to said second register means as is designated by the second part of such transfer syllable.

14. In a digital data processor as defined in claim 13 wherein said read means comprises second counting means associated with said first register means and adapted in cooperation with said transfer means for counting the number of characters being operated on for providing an indication of the last character stored in said first register means which is to be operated on and including means adapted for reading out another one of said groups of said first string of characters for storage in said first register means in response to said last character indication for providing a continuous supply of characters in said first register means.

15. In a digital data processor as defined in claim 13 including third counting means adapted in cooperation with said executing means for counting the number of characters contained in said second register means being operated on and for providing an indication of the last character therein to be operated on and writing means adapted for writing the content of said second register means into said memory means in response to said last character indication of said third counting means.

16. In a digital data processor in which two strings of characters are merged together comprising, addressable memory means for storing source and destination strings of characters and a string of program instruction syllables, means adapted for selectively reading said syllables and characters out of said memory means, a fixed group substantially simultaneously at a time, program, source and desination register means individually adapted for storing a program syllable group, a source character group and a destination character group read out of said memory means, means including separate counter means associated with said program and destination register means, said program register counter means being adapted for providing an indication of the next stored program instruction syllable to be executed, means adapted for merging the source characters stored in said source register means with the destination characters stored in said destination register means and for forming edited destination characters in said destination register means in accordance with the program instruction syllables designated by said program register counter means, said destination register counter means being adapted in cooperation with said merging means for counting the stored destination characters which have been merged and for providing an indication of the last character in the destination register means to be merged, and writing means responsive to the last destination character indication and arranged independently of program instruction syllables for writing a completely merged destination syllable group stored in said destination register means back into said memory means for causing an edited string of destination characters to be stored in said memory means.

17. In a digital data processor in which two strings of characters are merged together comprising, addressable memory means for storing source and destination strings of characters and a string of program instruction syllables, means adapted for selectively reading said syllables out of said memory means, means adapted for reading said characters out of said memory means, a group at a time, program, source and destination register means individually adapted for respectively storing at least one program syllable, a source character group and a destination character group read out of said memory means, means adapted for merging the source characters stored in said source register means with the destination characters stored in said destination register means and for forming edited destination characters in said destination register means in accordance with said stored program instruction syllable, destination register counter means adapted in cooperation with said merging means for counting the stored destination characters being merged and for providing an indication of the last character in the destination register means to be merged, and writing means responsive to the last destination character indication and arranged independently of program instruction syllables for writing a completely merged destination syllable group stored in said destination register means back into said memory means for causing an edited string of destination characters to be stored in said memory means.

18. In a digital data processor in which two strings of characters are merged together comprising, addressable memory means for storing source and destination strings of characters and a string of program instruction syllables, source and destination counting means adapted for counting through a sequence of steps corresponding to a series of memory locations in said memory means containing said source and destination string characters the memory locations each having a group of characters stored therein, means adapted for selectively reading said syllables out of said memory means, means adapted for reading the characters out of said memory means designated by said source and destination counting means, a fixed group at a time, program, source and destination register means individually adapted for respectively storing at least one program syllable, a source character group and a destination character group read out of said memory means, means adapted for merging the source characters stored in said source register means with the destination characters stored in said destination register means and for forming edited destination characters in said destination register means in accordance with said stored program instruction syllables, destination register counter means adapted in cooperation with said merging means for counting the stored destination characters being merged and for providing an indication of the last character in the destination register means to be merged, and writing means responsive to the last destination character indication and arranged independently of program instruction syllables for writing a completely merged destination syllable group stored in said destination register means back into said memory means into the destination string at the position designated by said destination counting means to thereby cause an edited string of destination characters to be stored in said memory means in sequential memory locations thereof.

No references cited.

ROBERT C. BAILEY, *Primary Examiner.*

UNITED STATES PATENT OFFICE
CERTIFICATE OF CORRECTION

Patent No. 3,235,848 February 15, 1966

Paul Daniel King et al.

It is hereby certified that error appears in the above numbered patent requiring correction and that the said Letters Patent should read as corrected below.

Column 3, line 49, for "Compression", in italics, read -- Comparison --, in italics; column 12, line 23, for "operation" read -- operator --; column 25, line 46, before "time" insert -- same --; column 26, line 26, after "state" insert -- and --; column 32, line 7, after "words" insert -- as --.

Signed and sealed this 24th day of January 1967.

(SEAL)
Attest:

ERNEST W. SWIDER
Attesting Officer

EDWARD J. BRENNER
Commissioner of Patents